US005487167A

United States Patent [19]

Dinallo et al.

[11] Patent Number: 5,487,167
[45] Date of Patent: Jan. 23, 1996

[54] PERSONAL COMPUTER WITH GENERALIZED DATA STREAMING APPARATUS FOR MULTIMEDIA DEVICES

[75] Inventors: Chris A. Dinallo; Michael J. Koval; William W. Lawton, all of Boca Raton; Martin J. Paulat, Jr., Delray Beach; John G. Tyler, Boynton Beach; Scott L. Winters, Plantation; Gary G. Allran, Boca Raton, all of Fla.

[73] Assignee: International Business Machines Corporation, Armonk, N.Y.

[21] Appl. No.: 288,650

[22] Filed: Aug. 9, 1994

Related U.S. Application Data

[63] Continuation of Ser. No. 816,517, Dec. 31, 1991, abandoned.

[51] Int. Cl.$^6$ ............................. G06F 13/00; G06F 17/00
[52] U.S. Cl. .............................................. 395/650; 395/154
[58] Field of Search ....................................... 395/650, 154

[56] References Cited

U.S. PATENT DOCUMENTS 5,170,252  12/1992  Gear et al. ............................... 358/181

OTHER PUBLICATIONS

Iacobucci, E., "OS/2 Programmer's Guide", McGraw–Hill, 1988, pp. 103–109.
Krantz et al., "OS/2 Features, Functions, and Applications", Standard Edition 1.0, John Wiley & Sons, Inc., 1988, pp. 62–65.
Network and Operating System Support For Digital Audio & Video R. G. Herrtwich (Ed.), Second International Workshop, Heidelberg, Germany, Nov. 1991.
Scheduling and IPC Mechanisms for Continuous Media, R. Govindan and D. P. Anderson, Computer Science Division, Dept. of Electrical Engineering and Computer Science, University of California, Berkeley, Calif. 94720, pp. 68–80.
On the Synchronization and Display of Multiple Full–Motion Video Streams, H. P. Kutseff and R. D. Gaglianello, AT&T Bell Laboratories, Holmdel, N.J. 07733 pp. 3–9.
Mapping New Applications onto New Technologies, International Zurich Seminar on Digital Communications, Zurich, Mar. 8–10, 1988, pp. B4.1–B4.6.
"Implementation Issues For a Network Continuous Media I/O Server", D. P. Anderson, etal, Report UCB/CSD 90/997, Sep., 1990, pp. 1–21.
"Meta–Scheduling For Distributed Continous Media", D. P. Anderson, Report UCB/CSD 90/599, Oct., 1990, pp. 1–32.
"Abstractions For Continuous Media In A Network Window System", D. P. Anderson, et al, Report UCB/CSD 90/596, Sep. 1990, pp. 1–20.

*Primary Examiner*—Thomas M. Heckler
*Attorney, Agent, or Firm*—Bernard D. Bogdon

[57] ABSTRACT

A multimedia data processing system includes a memory for storing multimedia application programs and a multitasking operating system. Extensions to the operating system control data streaming from source devices to target devices to provide real-time, continuous streaming. The extensions provide central buffer management with a user buffer option, bi-level priority support for data stream handlers, support for interleaved streams, and data stream event detection and notification.

7 Claims, 20 Drawing Sheets

FIG. 7
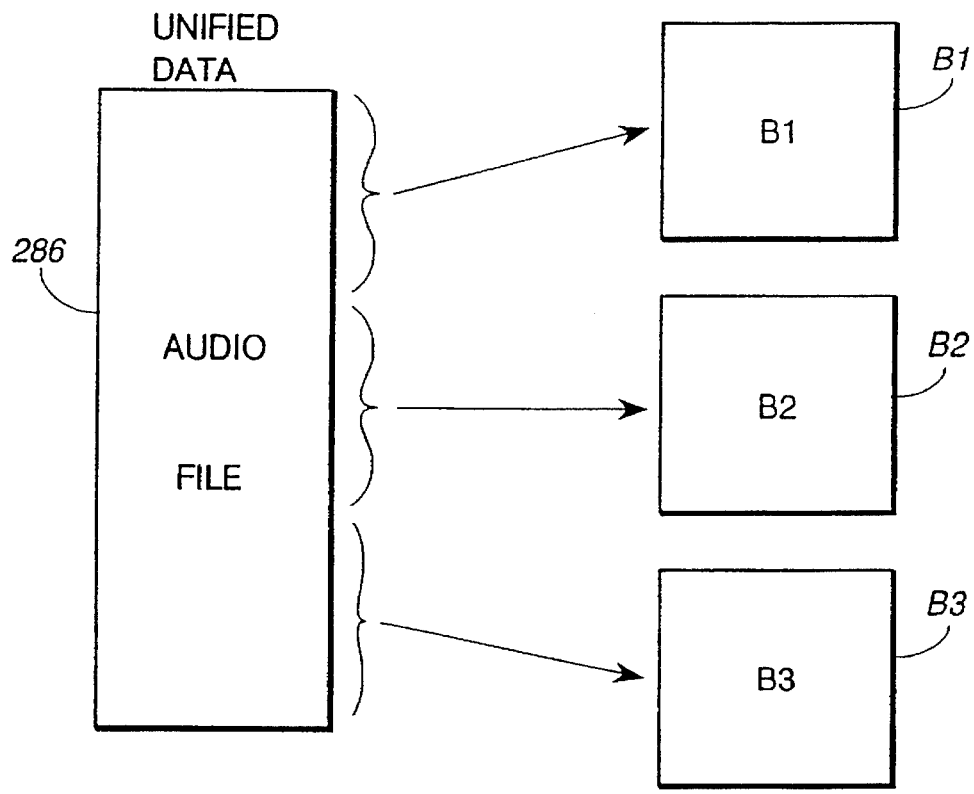
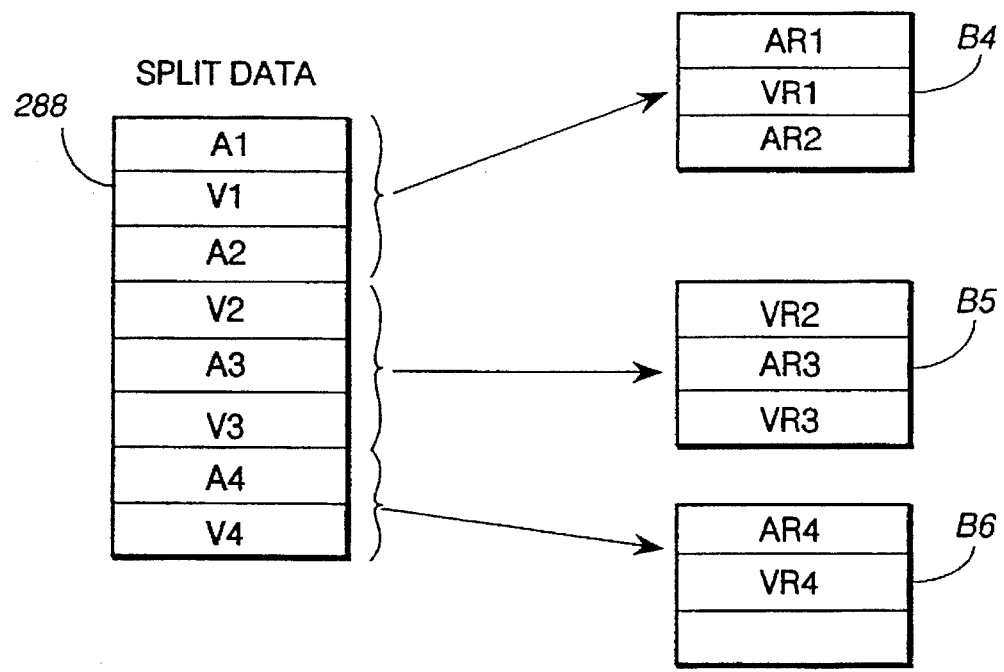

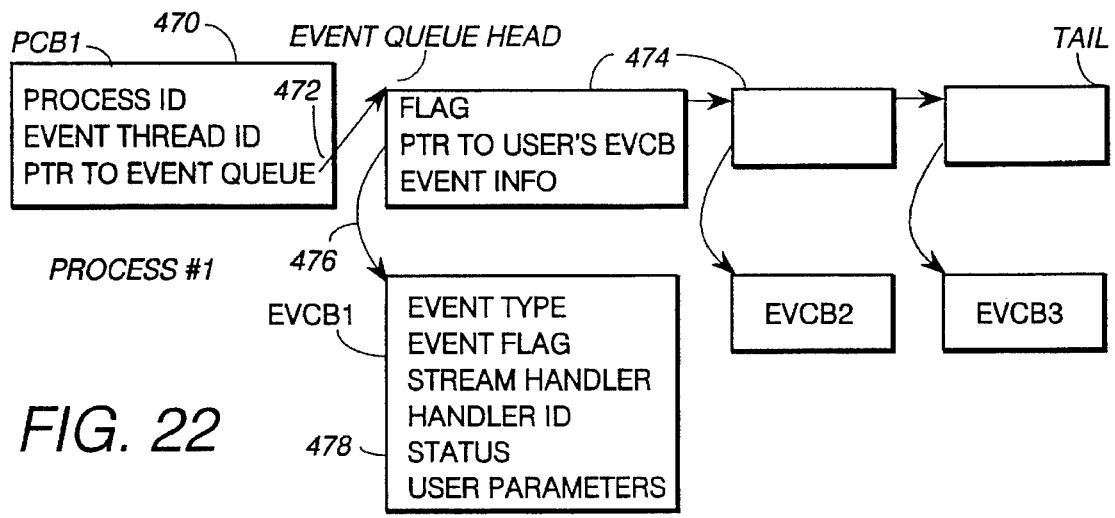
FIG. 22
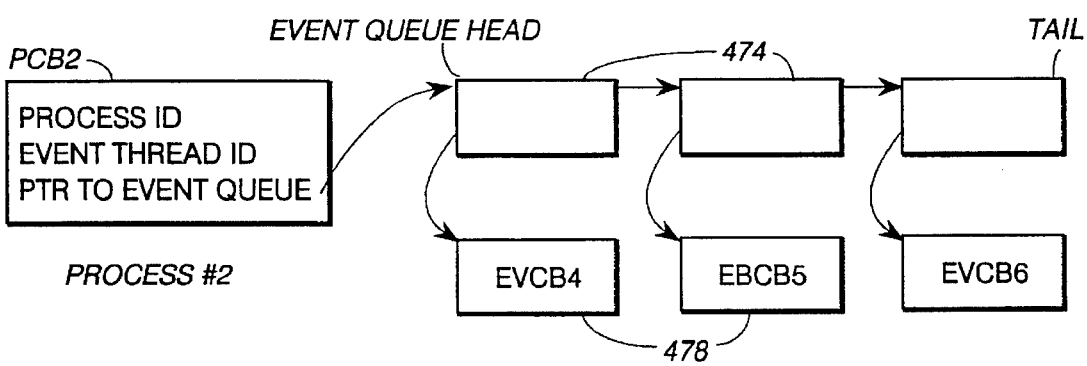
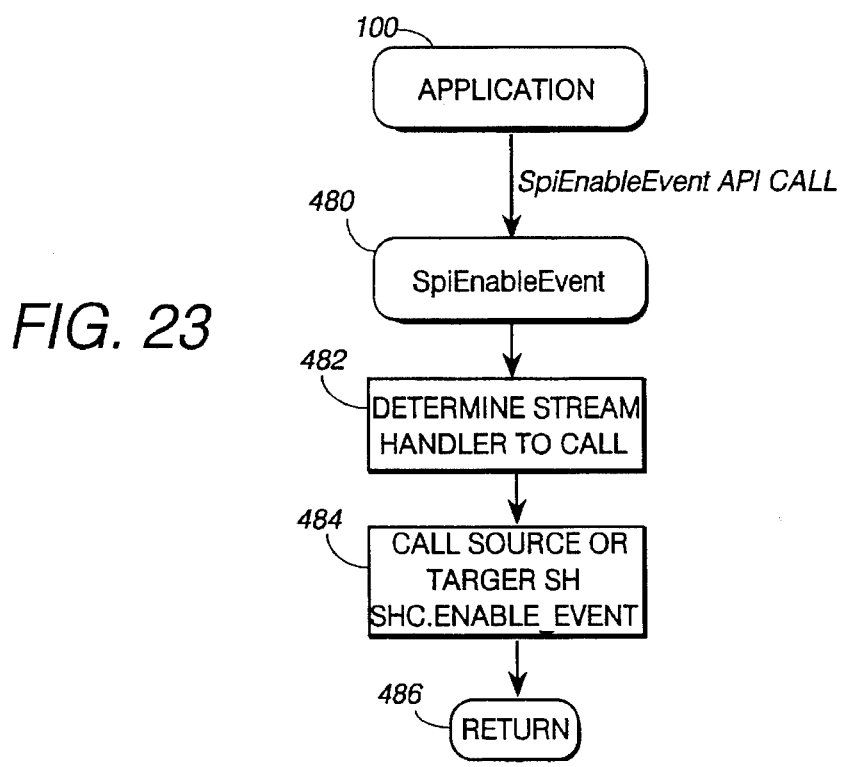
FIG. 23

PERSONAL COMPUTER WITH GENERALIZED DATA STREAMING APPARATUS FOR MULTIMEDIA DEVICES

This is a continuation of application Ser. No. 07/816,517 filed on Dec. 31, 1991, now abandoned.

FIELD OF THE INVENTION

This invention relates to the field of data processing, and, more particularly, to a personal computer based multimedia system in which data streaming occurs in a continuous, real-time fashion under the control of a multitasking operating system.

RELATED APPLICATION

The present application is related to application Ser. No. 07/815,652, now U.S. Pat. No. 5,333,299, filed on even date herewith, for "SYNCHRONIZATION TECHNIQUES FOR MULTIMEDIA DATA STREAMS" M. Koval et. al, and assigned to the assignee of the present application.

BACKGROUND OF THE INVENTION

A multimedia system is designed to present various multimedia materials in various combinations of text, graphics, video, image, animation, sound, etc. Such a system is a combination of hardware and software. The hardware includes a personal computer to which various multimedia devices can be attached. The hardware runs under the control of an operating system and multimedia application programs.

Multimedia applications impose heavy demands on the operating system to move large amounts of data from device to device, from system memory to a device, or vice-versa, in a continuous, real-time manner. Multimedia systems must support a flexible yet consistent means for transporting these large data objects, and control this activity accurately in real time. Adding new multimedia devices and data types should require minimal, if any, new system extension code. The total real memory requirements at run time must be minimized, so that system performance is not degraded. Also, support for complex data types and devices that manipulate interleaved data objects, must be provided. Finally, it must be possible to implement each multimedia data transport control means at the most appropriate system privilege level.

Operating system extensions that support multimedia data types and devices must provide the ability to control the many different multimedia I/O devices and to transport, or stream, large multimedia data objects within real-time constraints.

Multimedia applications control the input and output of large amounts of data, including the continual display of bitmaps, output of digitized audio waveforms or MIDI audio sequences, input of digitized audio from an analog microphone or line source, etc. The application controls all this data flow in the context of a real-time clock: certain events under program control must occur at explicitly defined points in time, and these times are defined very accurately (e.g., in milliseconds).

Given only the OS/2 control program services (DOS calls, or similar services in other operating systems such as AIX or UNIX), controlling this level of function at the application programming interface would require highly complex, device-specific, data transport control modules. Even if such modules were created, there would be no guarantee that the threads controlling each I/O operation would execute within its required time interval. To address this problem, the application would need to add sophisticated semaphore logic and make the I/O control threads time critical. The nature of multitasking operating systems, combined with the high data throughput load common to multimedia applications, will at times prevent data being delivered to the destination device within the allotted time interval. Failing to meet these real-time requirements will result in visible or audible defects in the multimedia presentation.

The real-time, continuous, high-volume data transport requirements present a set of interdependent problems that a generalized transport mechanism must solve:

1. Throughput-intensive Applications With Very Heavy Data I/O Demands

Uncompressed, digital motion video at 640×480×16 resolution requires approximately 3 Mb/sec. Even highly compressed, a digital motion video data stream can require transferring 60 Kb/sec. Adding 8 or 16-bit digital audio waveform data transfer into the scenario can increase the throughput load to 80 Kb/sec or greater. Supporting this throughput load continually while the multitasking system also performs other application functions such as file I/O and keyboard/mouse device control is the most important requirement for a generalized data streaming mechanism. But because the multimedia data presentations at the user interface (auditory and visual) are real-time dependant, these data transfers must occur within very tight real-time constraints.

2. Control of Multiple Different Hardware I/O Devices

Multimedia applications typically control a variety of I/O devices to manage presentations in the audio and video domains of the user interface. Audio devices that support waveform capture and playback, digital audio compact disc playback, Musical Instrument Digital Interface (MIDI) I/O, and voice-generation may be involved. Similarly, video devices that support NTSC (or PAL) video digitization, compression/decompression, and capture are routinely involved in multimedia presentation and/or authoring scenarios. The generalized data streaming mechanism must support these and future multimedia devices in a flexible manner, without requiring major modifications of the multimedia system extensions.

3. Provide Consistent Control Services Across Devices and Data Types

The data streaming mechanism must be controlled through services that are consistent across the different devices and data types involved in multimedia authoring and presentation scenarios. When new data types are introduced, as multimedia data standards evolve, this generalized streaming mechanism must not be substantially impacted. The control services must provide for easily incorporating new data types into existing applications. Likewise, these services must allow for seamlessly adding new I/O device types and capabilities, without impacting existing applications or requiring major revisions of the multimedia extensions.

4. Provide Identical Control Services at Multiple System Privilege Levels

Multimedia data objects may originate (or terminate) at a hardware I/O device, or in system (or application) memory. Where data streaming originates or terminates with a hardware device, the transport mechanism must be able to control behavior of the hardware device indirectly, rather than taking on direct control of the device, and thereby becoming device-specific itself. However, the nature of operating systems that support multiple privilege (or protection) levels—a common practice in modern operating systems—requires that for optimal performance the transport mechanism ("stream handler") should be attached to the device's native physical device driver at the highest system privilege level. This is the execution level where hardware device drivers typically run. Although it is desirable, for performance reasons, to create device driver level stream handlers, the stream handler device driver must not become hardware dependent itself. All hardware-specific code must be encapsulated in the device's native physical device driver. Alternatively, where no physical device is involved as the source or destination of the data stream, the stream handler may be implemented at a lower privilege level and still achieve optimal performance. Because the data transport mechanism is thus distributed across multiple privilege layers, identical stream control services must be provided at any level where the stream handlers execute. Multiple entry points at different privilege levels should be provided without incorporating redundant code.

5. Ability to Extend to New Devices/Data Types With Minimal Impact

New multimedia data standards and device types are being created almost continually. As this situation will persist for the indefinite future, the data transport mechanism must be able to easily and seamlessly adapt to support the new devices and data types.

6. Requirements for Physical Memory During Streaming Must be Kept to a Minimum

Despite the heavy throughput load imposed by multimedia applications, there should be conservation of memory resources at all times when data streaming is underway. Buffer management services should be provided so that applications do not need to become physical memory managers. However, since some applications create multimedia data objects in memory, these applications may need to have direct control over the memory buffers. This capability should be seamlessly supported by the data streaming mechanism and its control services.

7. CPU Loading Must be Kept to a Minimum During Streaming

Just as memory is a scarce resource that must be carefully managed, CPU cycles are another critical resource that cannot be squandered during multimedia application execution. The data streaming mechanism must keep CPU loads to a minimum by exploiting any direct hardware-to-hardware data transport capabilities (e.g., bus master data transfers). In addition, interrupt-driven device I/O should be exploited wherever possible to reduce CPU load, rather than allowing the data transport mechanism to control devices using device-polling techniques.

The following definitions are provided to establish a framework within which the present invention can be described:

Data Stream—A software means for data transfer through a data channel, in a continuous manner, from a source device (or memory address) to a target device (or memory address).

Dynamic Link Library (DLL)—In the OS/2 architecture, a 16-bit or 32-bit executable module that executes at privilege levels 2 or 3, and is loaded into memory in order to resolve the external references of another executable (e.g., .EXE) module. A DLL can execute only in a task context.

Physical Device Driver (PDD)—In the OS/2 architecture, a 16-bit executable module which executes at privilege level 0 (ring 0) and typically controls the operations of an I/O device. A PDD can execute in either a task context or a hardware interrupt context.

Stream—To continuously transfer data from a source to a destination (or target).

SUMMARY OF THE INVENTION

The invention provides an improved, generalized, data streaming, multimedia data transport mechanism between various I/O devices, application memory, and system memory that is designed to solve the problems and satisfy the requirements noted above. The transport mechanism is embodied within extensions to a multitasking operating system which incorporates multiple execution privilege levels. The mechanism supports continuous, real-time, data transfer referred to as data streaming.

DRAWINGS

Other objects and advantages of the invention will be apparent from the following description taken in connection with the accompanying drawings wherein:

FIG. 7 is a diagram illustrating unified and split data buffering;

FIG. 22 is a diagram of event data structures;

FIG. 23 is a flow chart of event enabling operations;

DETAILED DESCRIPTION

Multimedia System

Figure 1:
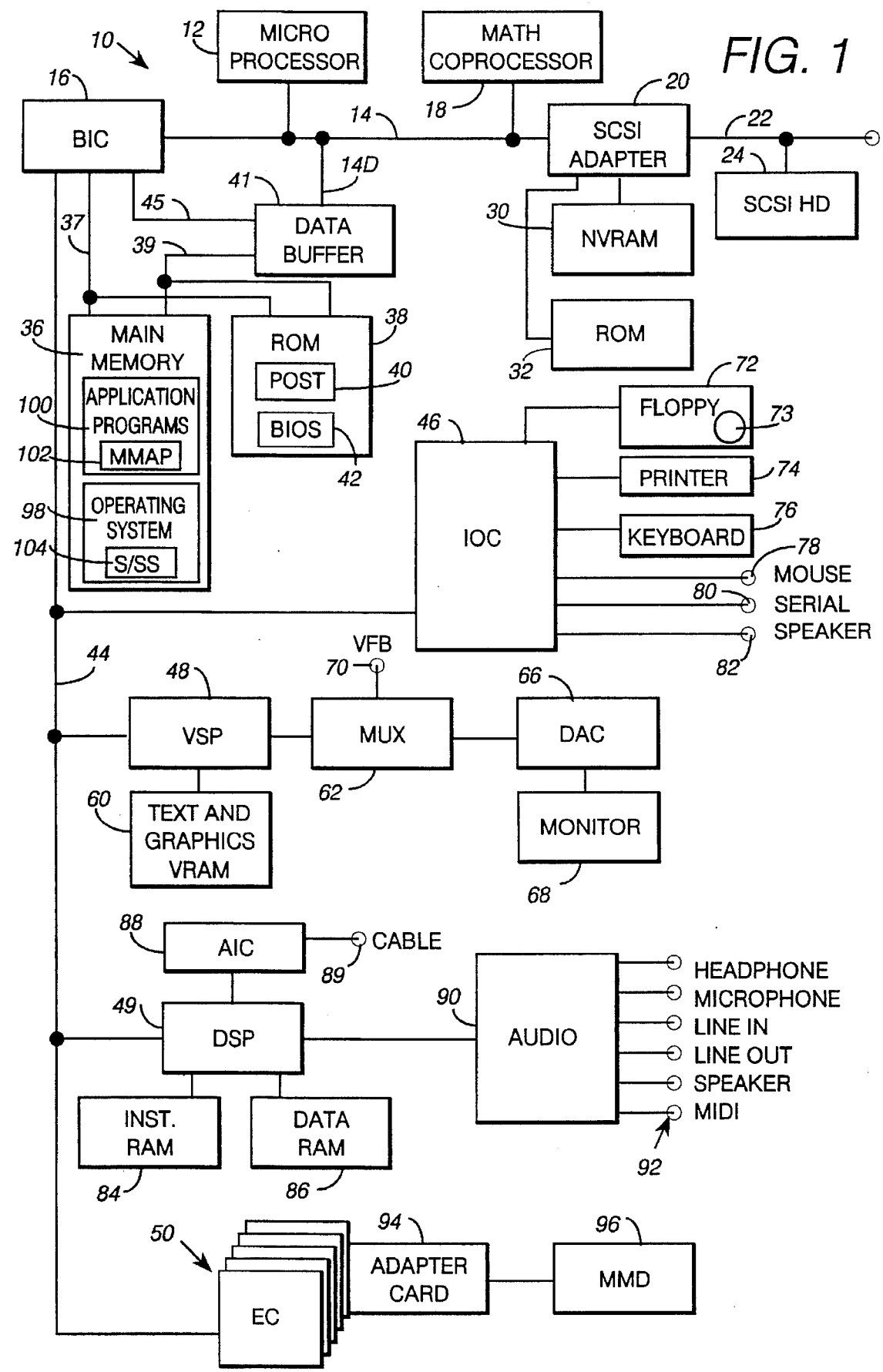
FIG. 1 is a block diagram of a data processing system embodying the invention.

Referring now to the drawings, and first to FIG. 1, there is shown an exemplary data processing system comprising a personal computer 10 operable under a multitasking operating system such as OS/2 Version 2.0, to execute application programs. Computer 10 comprises a microprocessor 12 connected to a local bus 14 which, in turn, is connected to a bus interface controller (BIC) 16, a math coprocessor 18, and a small computer system interface (SCSI) adapter 20. Microprocessor 12 is preferably one of the family of 80xxx microprocessors, such as an 80386 or a 80486 microprocessor, and local bus 14 includes conventional data, address, and control lines conforming to the architecture of such processor. Adapter 20 is also connected to a SCSI bus 22 which is connected to a SCSI hard drive (HD) 24 designated as the C:drive, the bus also being connectable to other SCSI devices (not shown). Adapter 20 is also connected to a NVRAM 30 and to a read only memory (ROM) 32.

BIC 16 performs two primary functions, one being that of a memory controller for accessing a main memory 36 and a ROM 38. Main memory 16 is a dynamic random access memory (RAM) that comprises stores data and programs for execution by microprocessor 12 and math coprocessor 18. ROM 38 stores a POST program 40 and a BIOS 42. POST program 40 performs a standard power-on, self-test of the system when computer 10 is started by turning the power on or by a keyboard reset. An address and control bus 37 connects BIC 16 with memory 36 and ROM 38. A data bus 39 connects memory 36 and ROM 38 with a data buffer 41 that is further connected to data bus 14D of bus 14. Control lines 45 interconnect BIC 16 and data buffer 41.

The other primary function of BIC 16 is to interface between bus 14 and an I/O bus 44 designed in conformance with Micro Channel (MC) architecture. Bus 44 is further connected to an input/output controller (IOC) 46, a video signal processor (VSP) 48, a digital signal processor (DSP) 49, and a plurality of expansion connectors (EC) or slots 50. VSP 48 is further connected to a video RAM (VRAM) 60 and a multiplexor (MUX) 62. VRAM 60 stores text and graphic information for controlling what appears on the screen of a monitor 68. MUX 62 is further connected to a digital to analog converter (DAC) 68 and to a connector or terminal 70 that is connectable to a video feature bus (VFB). DAC 66 is connected to monitor 68 that provides a conventional output screen or display for viewing by a user.

IOC 46 controls operation of plurality of I/O devices including a floppy disc drive 72 designated as the A:drive, a printer 74, and a keyboard 76. Drive 72 comprises a controller (not shown) and a removable floppy disc or diskette 73. IOC 46 also is connected to a mouse connector 78, a serial port connector 80, and a speaker connector 82 which allow various optional devices to be connected into the system.

DSP 49 is further connected to an instruction RAM 84, a data RAM 96, an analog interface controller (AIC) 88, and an audio controller (90). RAMS 84 and 86 respectively hold instructions and data used by DSP 49 for processing signals. Audio controller 90 controls various audio inputs and outputs and is connected to a plurality of connectors 92 by which various devices can be connected to the system. Such devices include a headphone, a microphone, a speaker, a musical instrument digitizing interface (MIDI), and devices requiring an audio line-in and line-out functions. Various other multimedia devices (MMD) 96 can be also attached to the system through an EC 50 and adapter card 94.

Memory 36 stores various programs for execution in the system, which programs include application programs 100, including multimedia application programs (MMAP) 102, and an operating system 98 having extensions thereto including a sync/stream sub-system (S/SS) 104. It is to be noted that while FIG. 1 illustrates an exemplary multimedia system, the operating system is general purpose and is designed to run or control data processing systems having configurations that are different from the one shown in FIG. 1. The invention is embodied primarily in S/SS 104 and its interaction with operating system 100, which will now be described.

Sync/Stream Sub-System

Figure 2:
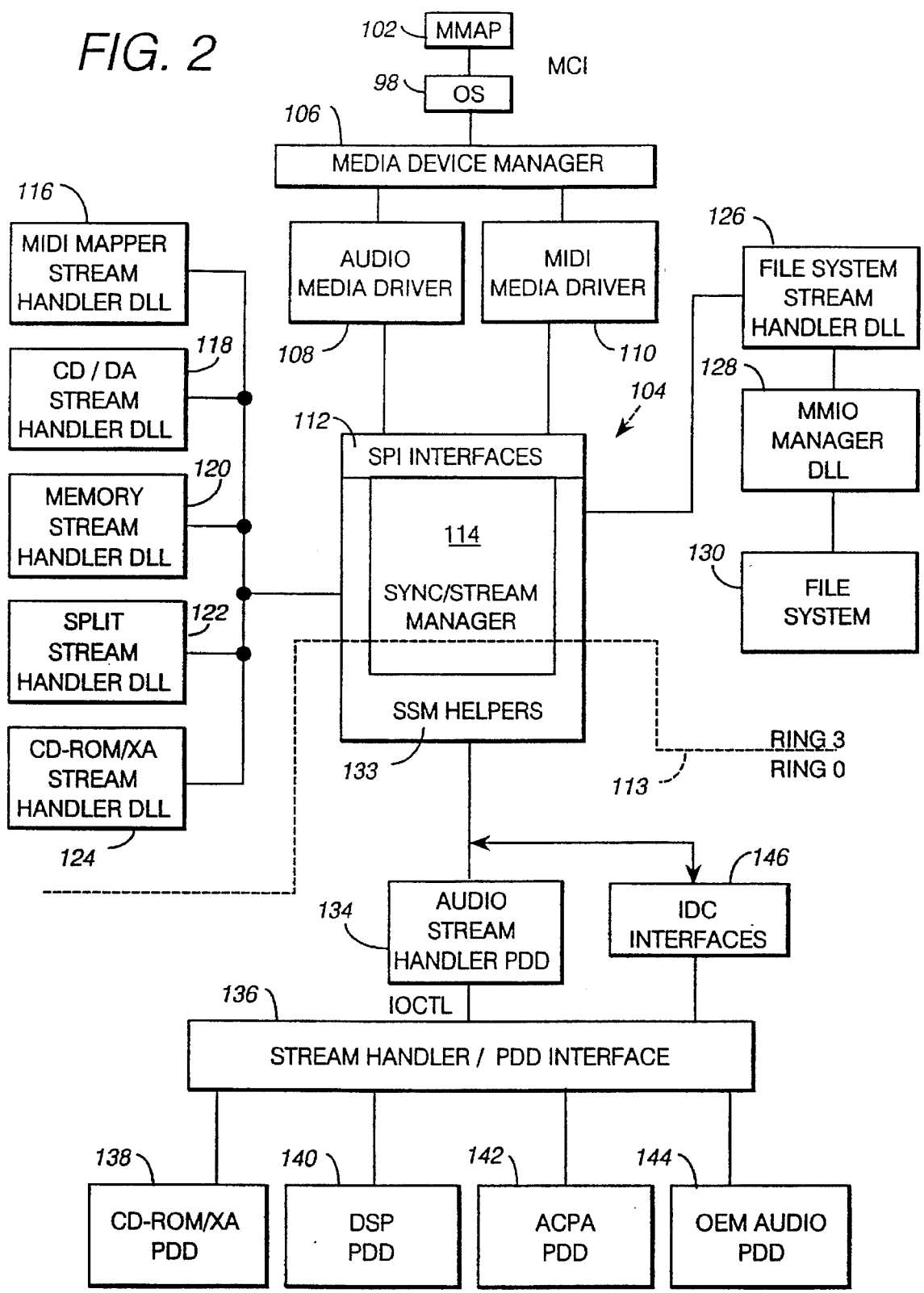
FIG. 2 is a block diagram of sync/stream subsystem architecture embodied in the system shown in FIG. 1.

Referring to FIG. 2, multimedia application programs 102 execute at a layer above operating system 98 and communicate through multimedia control interface (MCI) by sending MCI commands for controlling devices in the multimedia environment. Some of the basic commands are pause, play, record, resume, seek, save, set, stop, etc. Such commands are routed by the operating system 98 to a media device manager (MDM) 106. The application programming model for MMAPs is a logical extension of the OS/2 Presentation Manager programming model, incorporating both object oriented messaging constructs and procedural (call and return) programming interfaces. The MCI provides a view to application developers and users similar to that of a video and audio home entertainment system. Operations are performed by controlling the processors of media information known as media devices. Media devices can be internal or external hardware devices, or they can be software libraries that perform a defined set of operations by manipulating lower-level hardware components and system software functions. Multiple media devices may be included in a scenario, and they can be allocated and controlled as a group for the purpose of synchronized playback.

Multimedia applications must control two aspects of real time system behavior, the transfer of large amounts of data from one device to another and the synchronization of events that are related. Events under the control of the program must be perceived to be under the direct control of the user, and the underlying system functions facilitate and ensure that these events occur in a predictable, real-time manner. Multimedia application authors should write programs that operate on a real-time clock basis, rather than an approximate clock that could allow events to occur within windows of probability.

The MCI has two levels of dynamic link libraries (DLLs) comprising MDM 106 and media drivers including an audio media driver 108 and a MIDI media driver 110. MDM 106 provides resource management for media devices. It resolves contention for access to media devices and provides the application developer a view of resources that is independent of hardware. The media drivers are dynamic link libraries that implement the functionality of media devices. Media drivers invoke the services of hardware devices or software to implement their functionality. The media drivers do not directly control the hardware devices. Instead, they pass commands to S/SS 104 through a stream programming interface (SPI) 112 to a sync/stream manager (SSM) 114 which controls synchronization and streaming activities. SSM 114 performs two primary functions, the first being to control data streaming to provide continuous, real-time data streaming the inventive aspects of which are the subject of this present application. The second primary function involves synchronizing data streams and details of such function are covered by the above-identified related application.

Stream handlers are required at both the system kernel level and the application level. Some data streams are best controlled by a direct connection between a stream handler and the physical device driver at the Ring 0 priority level Such stream handler communicates with the PDD using a common interface based on OS/2 Interdevice Driver Communication (IDC). Other data streams are not associated with a data source or target that can be mapped to a specific physical device and can be controlled at the Ring 3 priority level by a DLL. Dotted line 113 generally indicates which items operate at the different priority levels. Within SSM 114, some routines operate at one level and other routines operate at the other level, as appropriate to the task at hand.

Each stream handler is programmable and is capable of streaming according to stream protocols. From the perspective of SSM 114, all stream handlers have similar responsibilities. Each handler is designed to be the source or target for one or more data streams where each data stream moves data independently, Manager 114 is responsible for connecting a stream source to an appropriate stream target, for maintaining data flow, and cleaning up the various resources when the stream has ended. Further, the stream handlers are not device dependent modules. Although each stream handler supports streaming data of specific predefined types, data is passed form one handler to the next without any knowledge of hardware behavior. Also, audio stream handler 134 can communicate with any compatible audio device PDD in a completely hardware independent manner. To be compatible, the PDD must conform to the IDC interface as well as to the standard audio device driver interface IOCTL. Thus as shown, stream manager 114 interacts with a plurality of stream handler dynamic link libraries (DLL) 116–126 which respectively are MIDI mapper, CD/DA, memory, split stream, CD-ROM/XA, and file system, stream handlers. File system stream handler DLL 128 calls a multimedia I/O (MMIO) manager for accessing a file system 130.

Stream manager 114 also interacts through stream manager helpers 133 with an audio stream handler physical device driver (PDD) 134 that selectively accesses physical devices through a stream handler/PDD interface 136 and a plurality of PDDs 138–144. Stream manager 114 can also interact with interface 136 through inter-device communication (IDC) interfaces 146.

Figure 3:
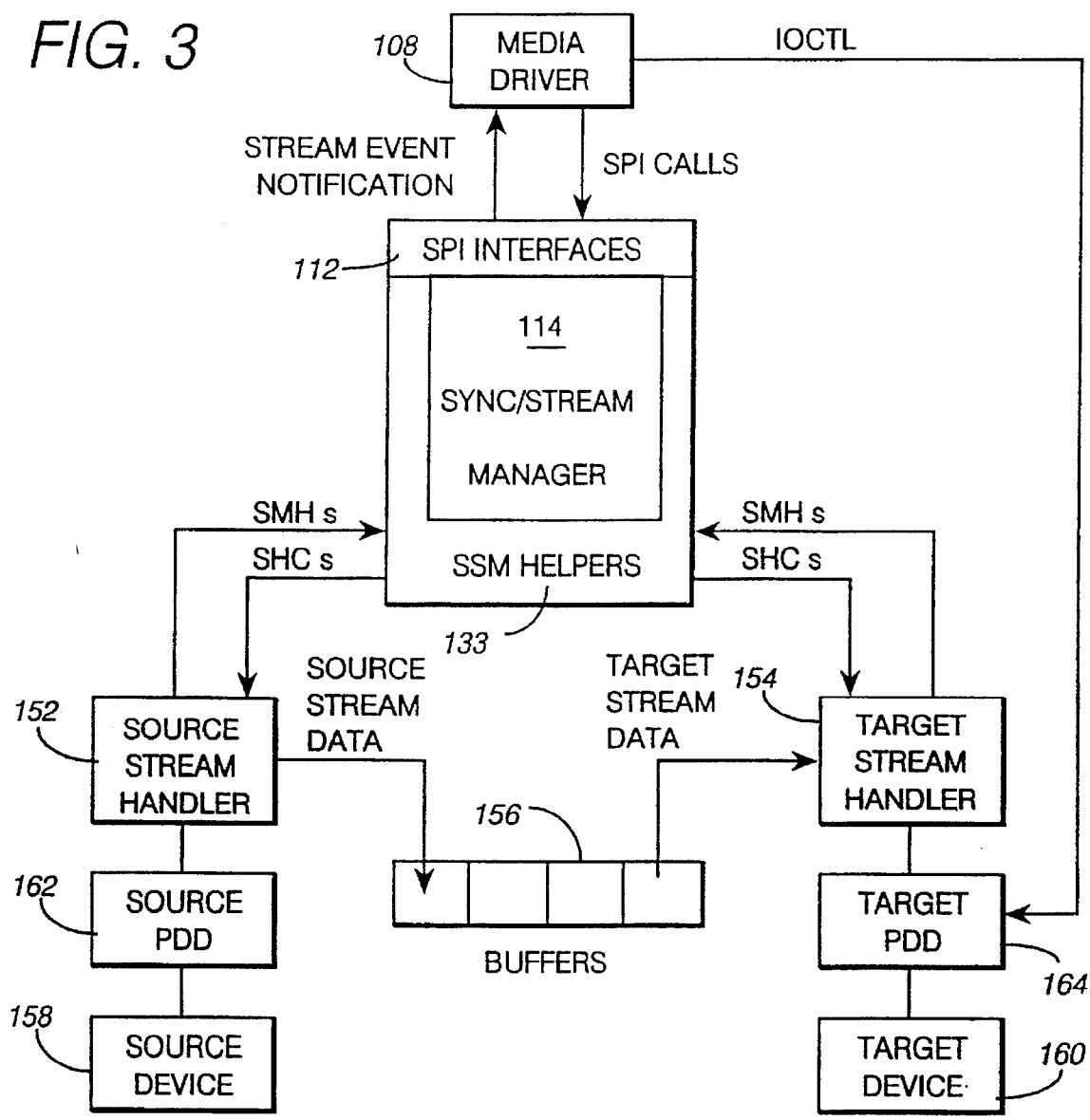
FIG. 3 is a block diagram illustrating a generalized model of data streaming.

FIG. 3 is a generalized model of data streaming operations the details of which are discussed relative to the flow charts and data structures in the remaining figures. FIG. 3 shows generally a single data stream 151 and how data flows or is transported under the control of stream manager 114, and source and target stream handlers 152 and 154. A plurality of stream buffers 156 are allocated in memory for use in streaming. Buffers 156 are filled with stream data from a source device 158 and are emptied of stream data by transmitting the data to a target device 160. Data stream 151 comprises two portions, source stream data 153 and target stream data 155. The data path for the source stream data is from source 16, through source PDD 162, and through stream handler 152 to buffers 156. The data path for the target stream data 155 is from buffers 156, through target stream handler 154, through target PDD 164, and to target device 160. Source stream handler 152 actuates a source PDD 162 which in turn controls operation of the source device. Target stream handler 154 actuates a target PDD 164 which controls target device 160. The general objective is for the source stream handler 152 to fill at least two of stream buffers 156 before the target device is started, and, once the target device has started, to thereafter keep ahead of the target device by filling buffers, until the complete source data has been transferred. After the buffers ar filled, the target stream handler can then obtain target data therefrom and transfer it to the target device.

Media driver 108 interacts with SPI interface 112 by sending SPI functions or calls and receiving stream event notifications. Manager 114 interprets the SPI calls and in response thereto performs the desired functions by interacting with the stream handlers by sending system helper commands SHCs to the handlers and receiving stream manager helpers SMH calls from the handlers. Media driver 108 can also directly control PDD 164 by issuing control functions defined by standard IOCTL commands. The principal SPI calls related to the invention are SpiCreateSream and SpiStartStream which respectively setup up the desired stream(s) and then start the data streaming, as discussed in more detail below with reference to FIGS. 20 and 21. Should there be plural streams that must be synchronized, a SpiEnableSync call is made, as more fully discussed in the related application.

Figure 4:
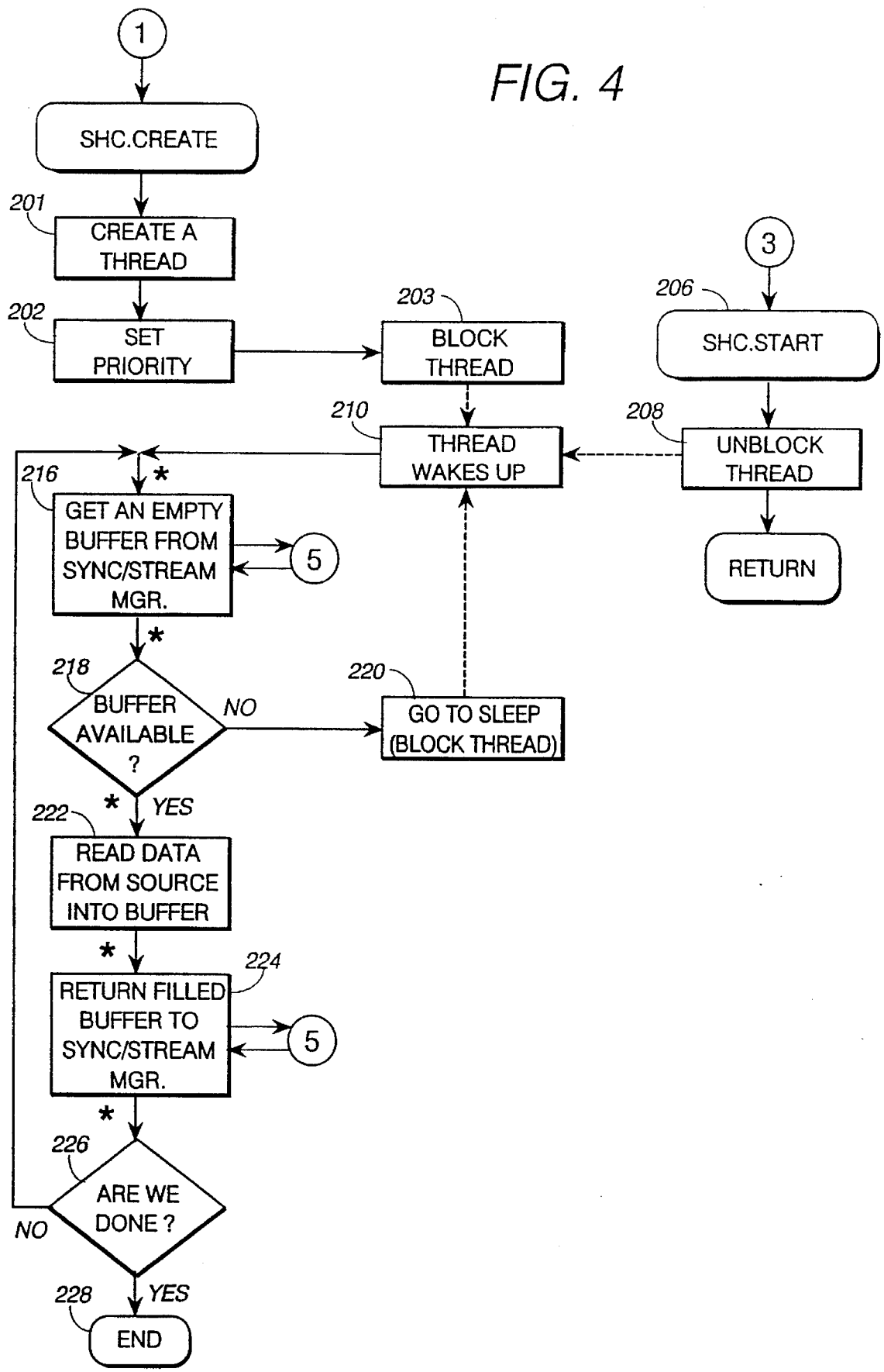
FIG. 4 is a flow chart of source stream handler operations.

FIG. 4 illustrates what happens when a stream handler command SHC.CREATE is executed. However, before describing that, it might be useful to understand how that point is reached relative to an application program. First the MMAP issues an MCI call to create a data stream. Such call is analyzed by the OS in 98 which sends information to media device manager 106. This manager then selects the appropriate media driver that sends an SpiCreateStream call to sync/stream manager 114 which then issues the SHC.CREATE command to the appropriate stream handler.

FIG. 4 illustrates what happens when the SHC.CREATE command is executed by a DLL source stream handler 152. First, step 201 creates a thread under the OS which will be controlled by the multitasking features of the OS. Step 202 assigns a priority level to the thread as appropriate to the task to be performed, and then the thread is blocked on a semaphore in step 203 and goes to "sleep". The priority level may be used to control the rate at which the OS dispatches and executes the thread. If discontinuities arise, priority levels may be adjusted.

Figure 20:
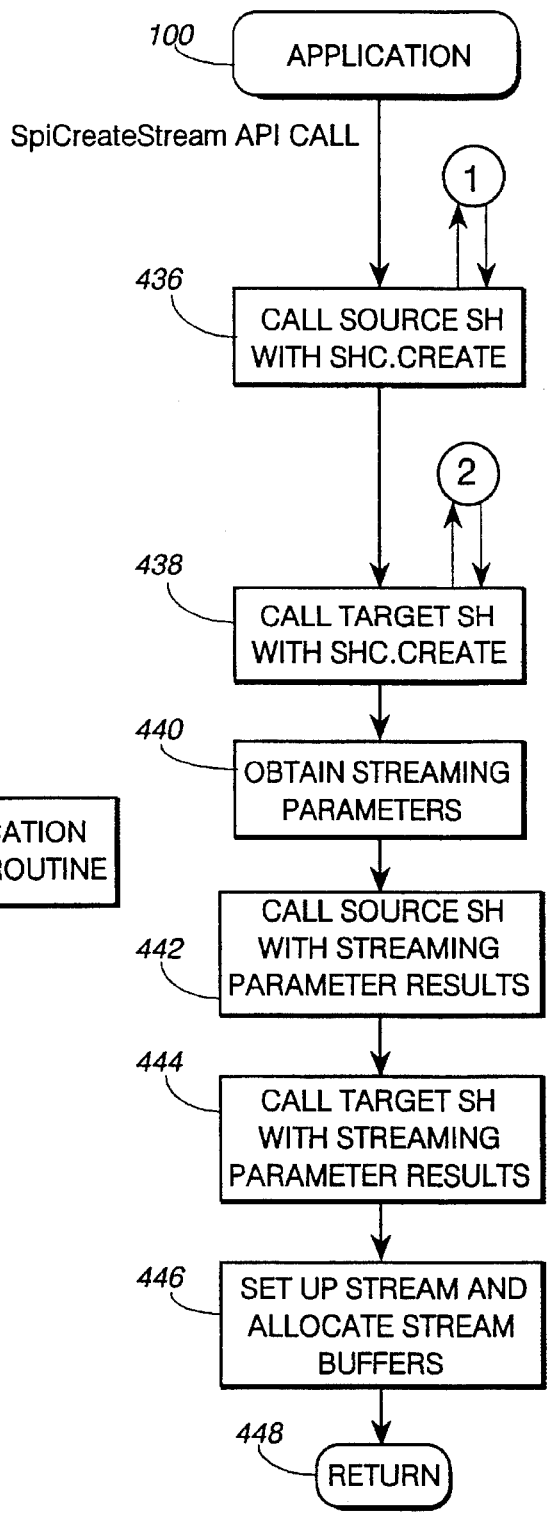
FIG. 20 is a flow chart of sync/stream manager create stream operations.

It is to be noted that in accordance with the standard operation of OS/2, the threads are treated as individual tasks, and control returns to the OS when the threads are blocked, when calls are made, when returns are made, etc. This allows the operating system to execute other tasks in the system and to return to the streaming threads, on a multitasking basis. It should also be noted that several connectors appear in the drawings, the connectors including a circled numeral along with arrows indicating the direction of program flow. For example, connector 1 appears in both FIG. 4 and FIG. 20. In FIG. 20 the connector includes both call and return arrows, whereas the connector 1 in FIG. 4 includes only a call arrow indicating the routine is being called elsewhere. The other connectors can be interpreted in the same manner.

In response to the start command being made in the application program, manager 114 sends a SHC.START command first to the source thread handler in 206 (FIG. 4) and then to the target stream handler. The source stream handler needs to be started first to fill stream buffers before the target handler can use the data being transferred thereto. In response to such command, the source stream handler in step 208 unblocks the source thread. In response to being unblocked or awakened, source thread then requests, in step 216, an empty buffer from manager 114. If a buffer is not available, as determined in step 218, step 220 then blocks the thread again. If an empty buffer is available, then step 222 reads data from the source device and fills the buffer. Step 224 then returns the filled buffer to manager 114. Step 226 decides if any more buffers need filling. If so, a branch is made back to step 216 and a loop is formed from steps 216–226 which loop is broken when step 226 decides no more buffers need filling. Then, the thread is blocked. Once the streaming operation has been started, buffer filling process repeats until the end of the source file is reached at which point the source thread quiesces. Event detection can be inserted in the sequence of operation at any of the points indicated with an asterisk in FIG. 4, e.g., using cue point detection to keep track of time where time is determined by the rate of data transferred. Event detection can also be used in many of the routines that follow.

Figure 5:
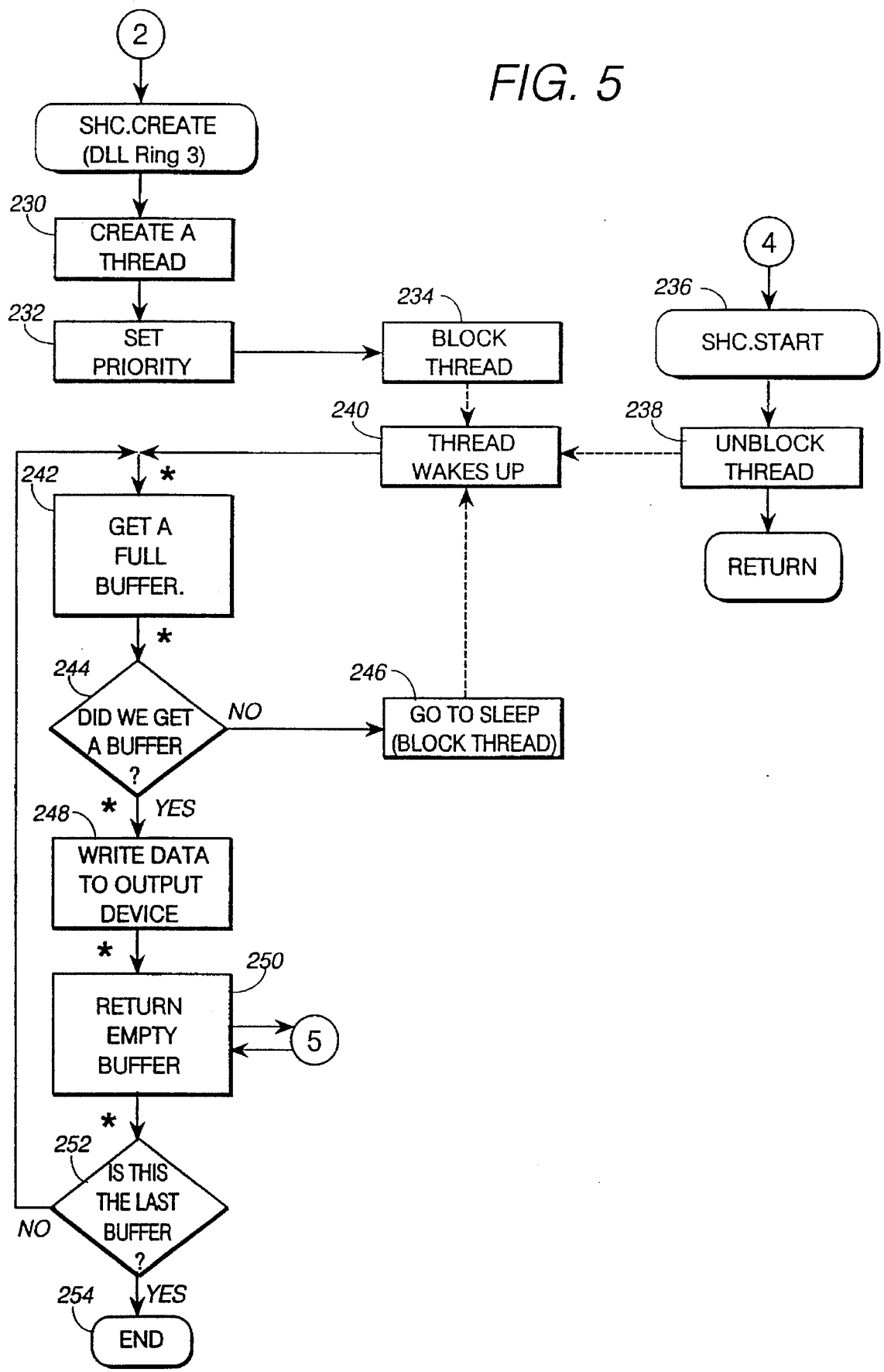
FIG. 5 is a flow chart of one type of target stream handling operations.

FIG. 5 illustrates operating the a DLL target stream handler at ring 3 priority level. Target stream handler receives from manager 114 an SHC.CREATE to also create a target data stream and it first creates a target stream thread in step 230, assigns a priority to the thread in step 232, and blocks the target thread on a semaphore in step 234. When the target thread is awakened by manager 114 issuing a SHC.START command in step 236, the target thread is unblocked in step 238 to awaken the thread in step 240. Step 242 attempts to get a full buffer from the data stream. Step 244 checks to see if a buffer is obtained, and, if not, step 246 blocks the target thread. If a full buffer was obtained, step 248 writes the data in the buffer to the target device and then returns an empty buffer in step 250 to manager 114. Step 252 checks to see if the buffer is the last buffer in the data stream i.e. has the EOS been reached. If not, a branch is made back to step 242 to repeat the process of getting a full buffer. The loop repeats until the end of stream is detected, whereupon step 244 ends the thread.

Figure 6:
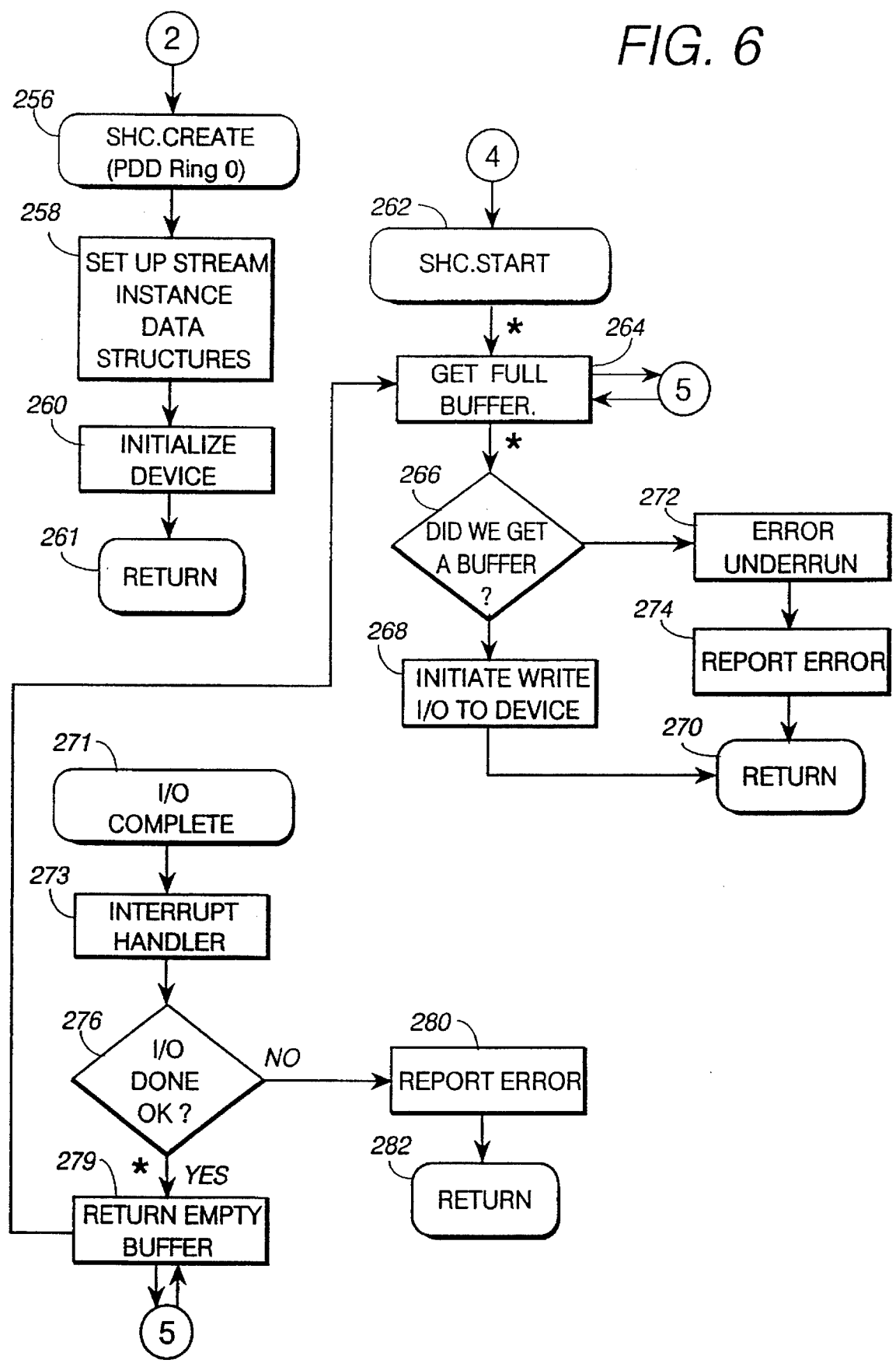
FIG. 6 is a flow chart of another type of target stream handling operations.

FIG. 6, to which reference is now directed, shows a target stream handler implemented in a physical device driver at a ring 0 priority level. When an SHC.CREATE command is received in step 256, step 258 sets up the stream data structures and step 260 initializes the target device. A return is made in step 261. When the stream is started in step 262, a request for a full buffer is made in step 264 to manager 114. Step 266 determines if a buffer was given. If so, step 268 initiates a Write I/O and a return is made by step 270. If no buffer was returned as a result of step 272 determining there was an error underrun, step 274 reports the error and then a return is made.

When the I/O operation is completed by writing and emptying the buffer, step 272 then make an interrupt which is handled by an interrupt handler in step 274. If the I/O operation was done without error, step 278 then returns the empty buffer to manager 114, and a branch is made to step 264 to repeat the process. If an error occurred during the I/O operation, step 280 reports the error and a return is made in step 282. A source stream handler operating a Ring 0 priority level performs operations the same as shown in FIG. 6 except that it gets an empty buffer and returns a full buffer.

There are two types of data files and streams which can be used, a unified or non-interleaved stream and a split or interleaved stream. A unified data stream and file contains data of only one type, e.g., only audio data. A split stream contains data of more than one type, e.g, both audio data and video data. An example is the type of file commonly created for CD-ROM devices. FIG. 7 shows examples illustrating the different types. File 286 represents a unified file containing only audio data of a given type. Such file is read into a plurality of buffers B1–B3, by filling buffer B1 with a first section of the audio data, then B2 is filled with the next section of audio data, etc. File 288 is a split or interleaved file having a plurality of sections of interleaved audio and video data. The sections are paired so that the audio corresponds to the video being presented. When such data is transferred into associated buffers B4–B6, it is done so as records. Thus, the first audio section A1 becomes audio record AR1 in B4, the first video section V1 becomes video record VR1, in B4, and the second audio section A@ becomes AR2 in B4. Next, sections V2, A3, and V3 are transferred to buffer B5 as records VR2, AR3, and VR3. Buffer B6 is similarly filled with AR4 and VR4. Quite obviously, in this example, the buffers B4–B6 are each of a size to hold three records.

Figure 8:
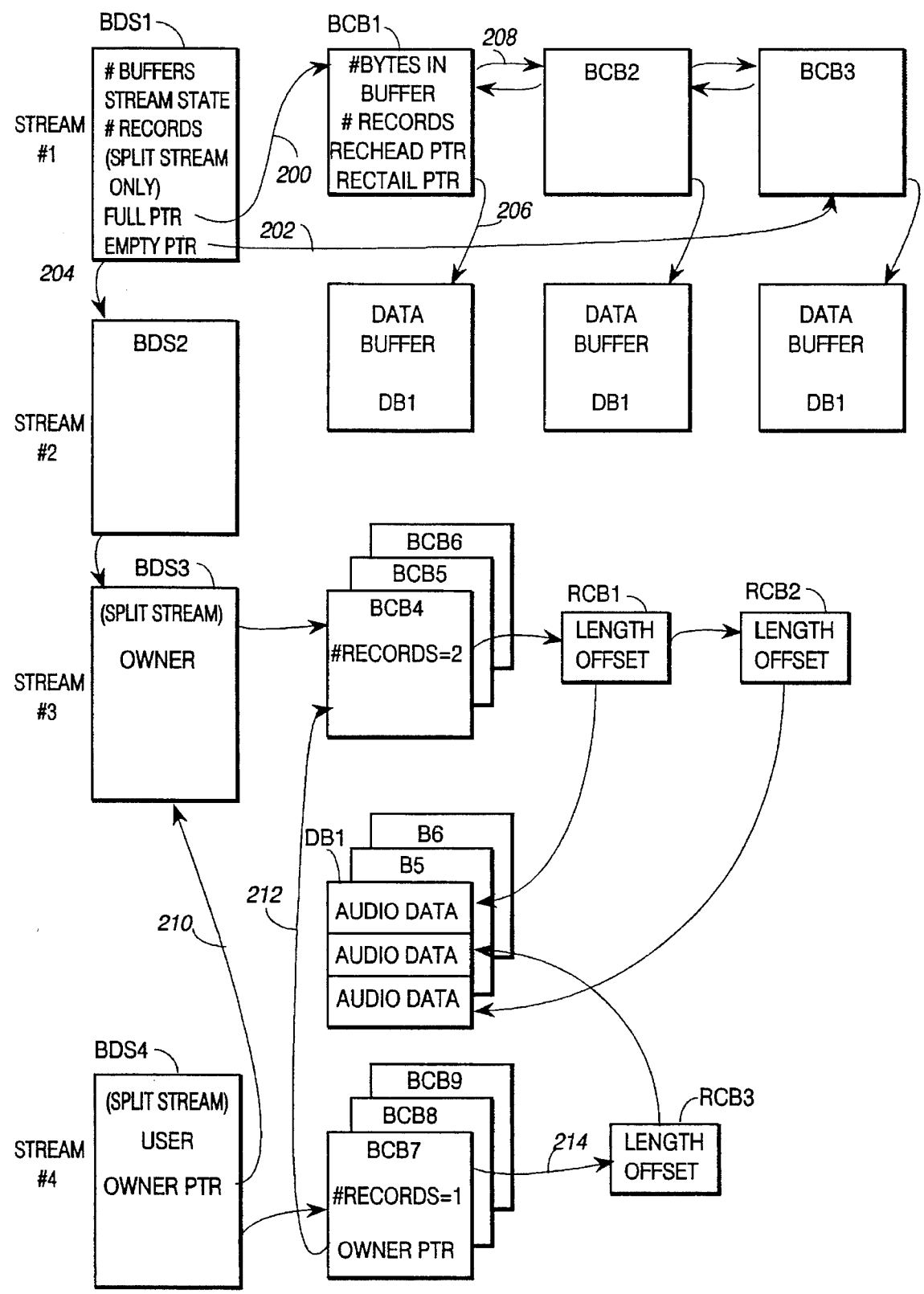
FIG. 8 is a diagram of buffering data structures.

When streams are created by manager 114, a plurality of buffers are allocated to each stream and, data structures are formed containing data used to manage the streams. Referring to FIG. 8, for each stream, a buffer directory structure BDS is created which is added to a linked list of BDSs of other streams. A chain of buffer control blocks is created for each stream, there being one BCB for each buffer allocated to the stream. As shown, BDS1 is created for stream #1 is chained to three RCBs RCB1–RCB3 which respectively are associated with and point to three buffers B1–B3 allocated to stream #1.

Each BDS contains a plurality of fields for storing information on the number of buffers allocated to the stream, the state of the stream, the number of records in a buffer (for split streams), a pointer 200 to the RCB of the first full buffer, a pointer 202 to the RCB of an empty buffer, and a pointer 204 to the next BDS in the list. The different states of a stream include, running, stopped, paused, and prerolled or primed. The latter is an option which allows for quick starts by filling all of the buffers from the source prior to starting the target device. Each BCB stores information including the number of bytes in the buffer, the number of records in a split stream buffer, a pointer 206 to the buffer, and pointer 208 to the next BCB in the chain, and pointers to the head and tail of the RCB chain.

Streams #3 and #4 illustrate buffering data structures for split streams using the example in FIG. 7. A BDS is set up for each data type in the split stream. BDS3 is setup for audio data and BDS4 is set up for the video data. As buffer B4 is filled with the three records, two record control blocks RCB1 and RCB2 are created and filled to indicate the offsets into B1 of audio records AR1 and AR2, and the lengths thereof. BCB4 is set to indicated there are two records in buffer B1. Concurrently, RCB3 is also created to indicated the offset into buffer B1 of video record VR1 and the length thereof. The number of records field in BCB7 is set to one corresponding to only one video record being stored therein. Additional BCBs and RCBs are similarly created and filled for the remaining buffers allocated to the split stream. Also for a split stream, one BDS is designated owner and any remaining BDS is considered a user. The linked lists contains pointers 210 from each user BDS to the associated owner BDS. Further there are the following pointers: a pointer 212 from a user BCB to the owner BCB; and pointers 214 from a BCB to RCBs chained thereto.

Figure 9:
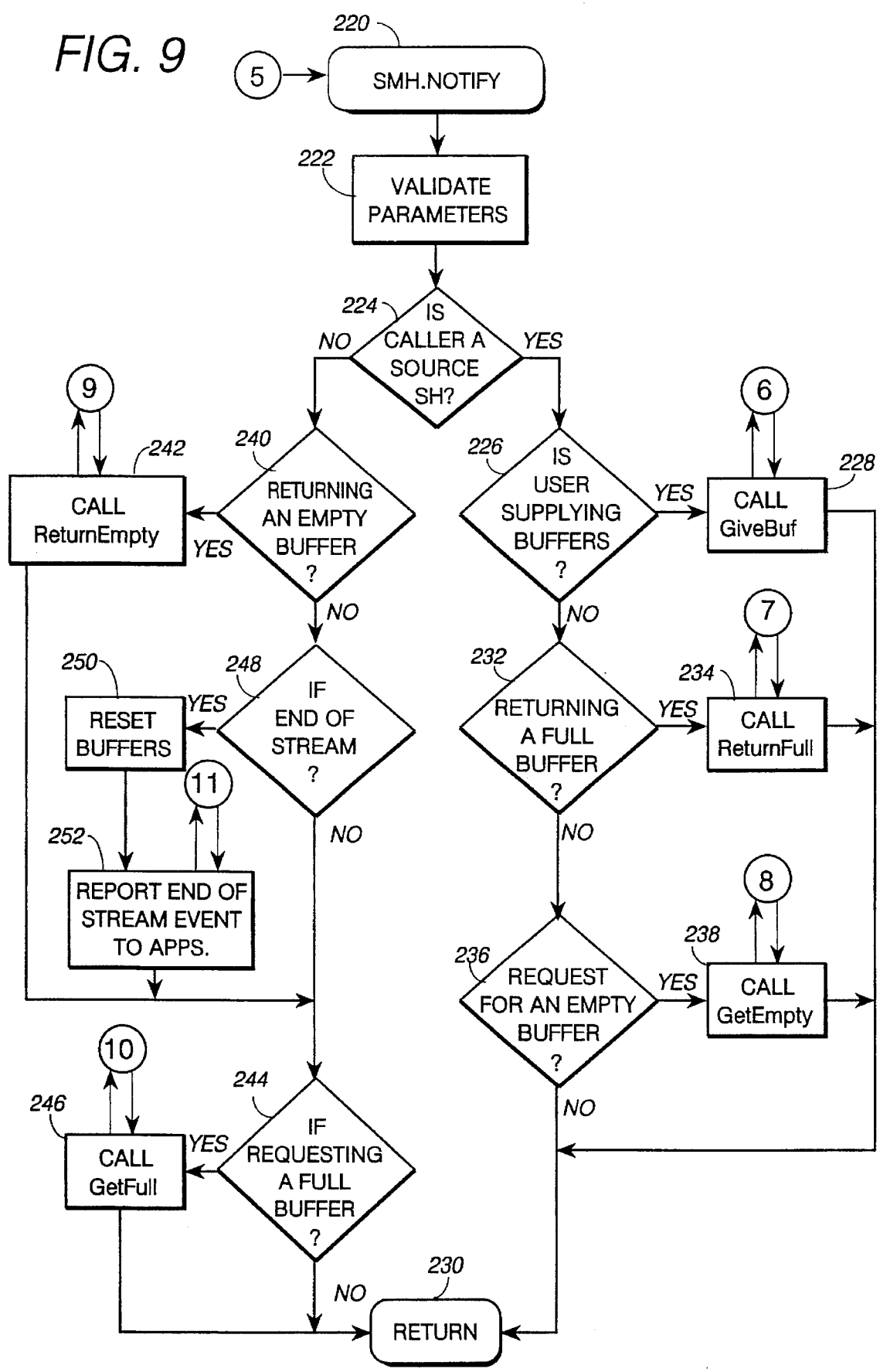
FIGS. 9–19 are flow charts of interlocking sync/stream buffer management operations.

SSM 114 is called from the stream handlers using stream manager helpers (SMHs). Referring to FIG. 9, when manager 114 receives a SMH.NOTIFY call at 220 to get or return a buffer or a record, the call parameters are verified in step 222, and step 224 determines whether the caller is a source stream handler or a target stream handler. If it is a source system handler, step 226 determines if the user or application is supplying buffers. If so, step 228 calls the GiveBuf routine and upon being returned to in step 228, step 230 returns to the caller. If step 226 results in a negative determination, step 232 decides if the a full buffer is being returned. If so, step 234 then calls ReturnFull routine and upon its return, a return is made through step 230 when a full buffer is returned or step 236 is executed to determine if the request is for an empty buffer. Step 236 is also executed when step 232 determines the request is not for a full buffer. If 236 makes a positive determination, step 238 then calls the GetEmpty routine and returns via 230

If step 224 indicates the caller is not a source stream handler, meaning it must be a target one, step 240 determines if an empty buffer is being returned. If so, step 242 the calls ReturnEmpty routine and step 244 determines if the request is for a full buffer. If not, a return is made via 230. If so, step 246 calls the GetFull routine before returning via 230. If step 240 results in a negative determination, step 248 checks to see if the end of the stream has been reached. If not, step 244 proceeds as before. If so, step 250 resets the buffers, and step 252 reports an end of stream event to the application before passing to step 244.

Figure 10:
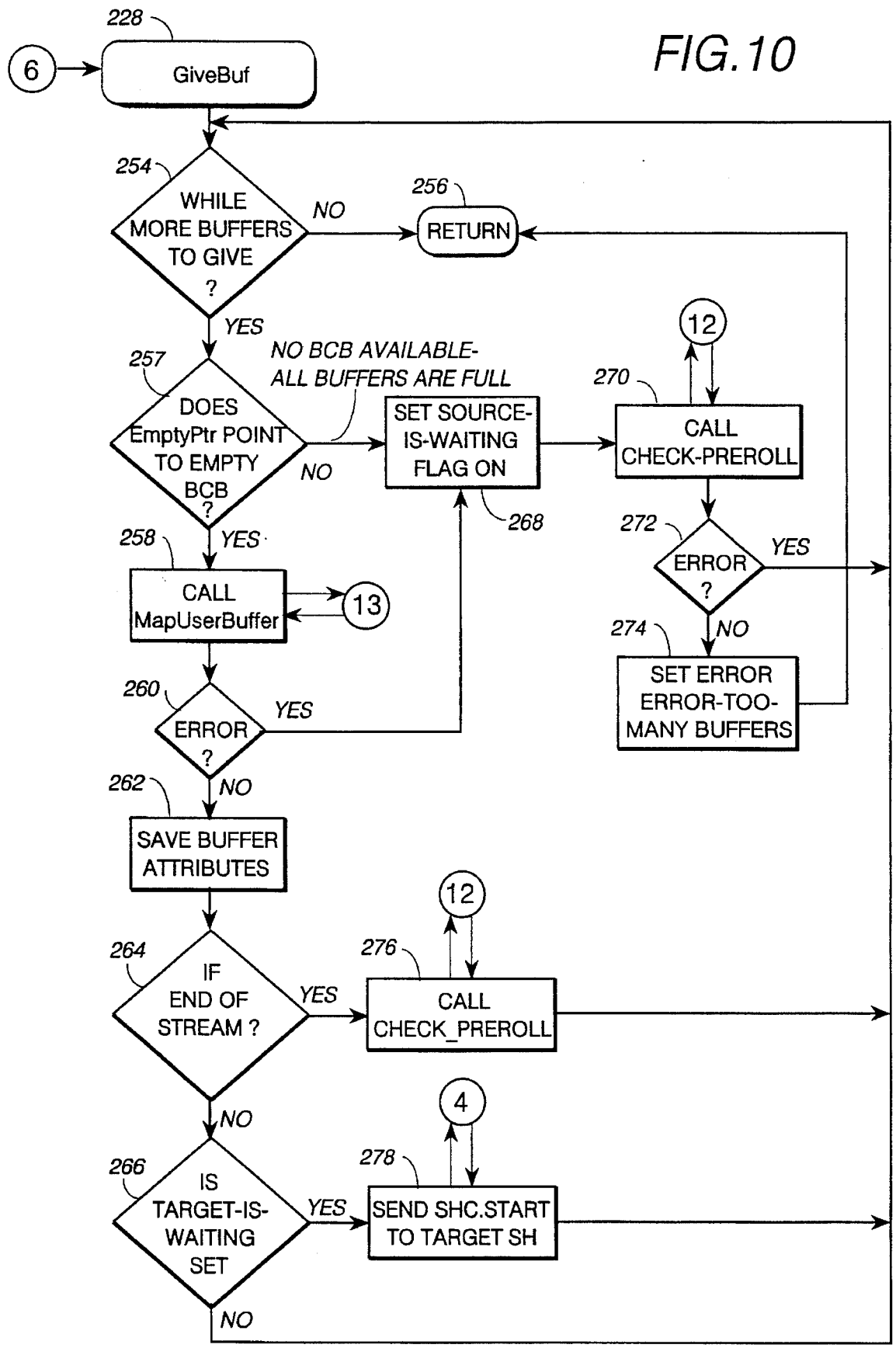

FIG. 10 shows the GiveBuf routine 228 in which step 554 checks to see if there is any remaining buffer to give. If not, a return is made in step 256. If there is such a buffer, step 257 checks to see if an empty pointer points to an empty BCB. If one is pointed to, step 258 calls MapUserBuffer routine 258. Afterward, step 260 checks for errors. If none occurred, step 262 saves buffer attributes and step 264 checks to see if the end of the stream has been reached. If not, step 266 checks to see if a Target.is.waiting flag is set. If not, a loop is made back to step 254. If step 256 produces a "no" answer, step 268 sets Source.is.waiting flag on and step 270 calls a CheckPreroll routine. Step 272 checks for error. If none, control passes to step 254. If an error is noted in 272, step 274 sets error flag indicating too many buffers and a return is made by 256. If step 264 answers positive, step 276 calls check-preroll routine and then goes to step 254. If step 266 is positive, step 278 sends a helper command to start the target stream handler.

Figure 11A:
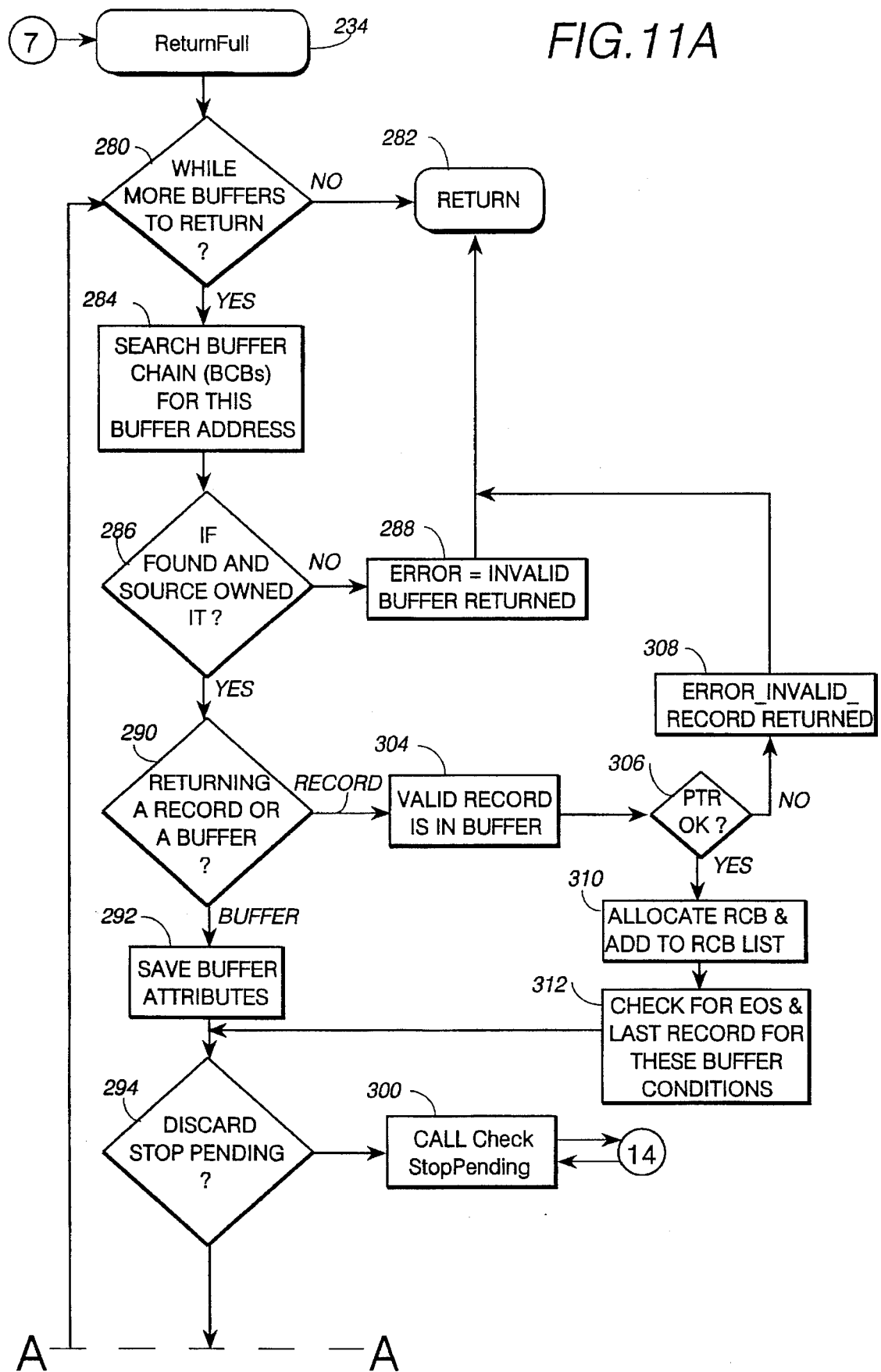
Figure 11B:
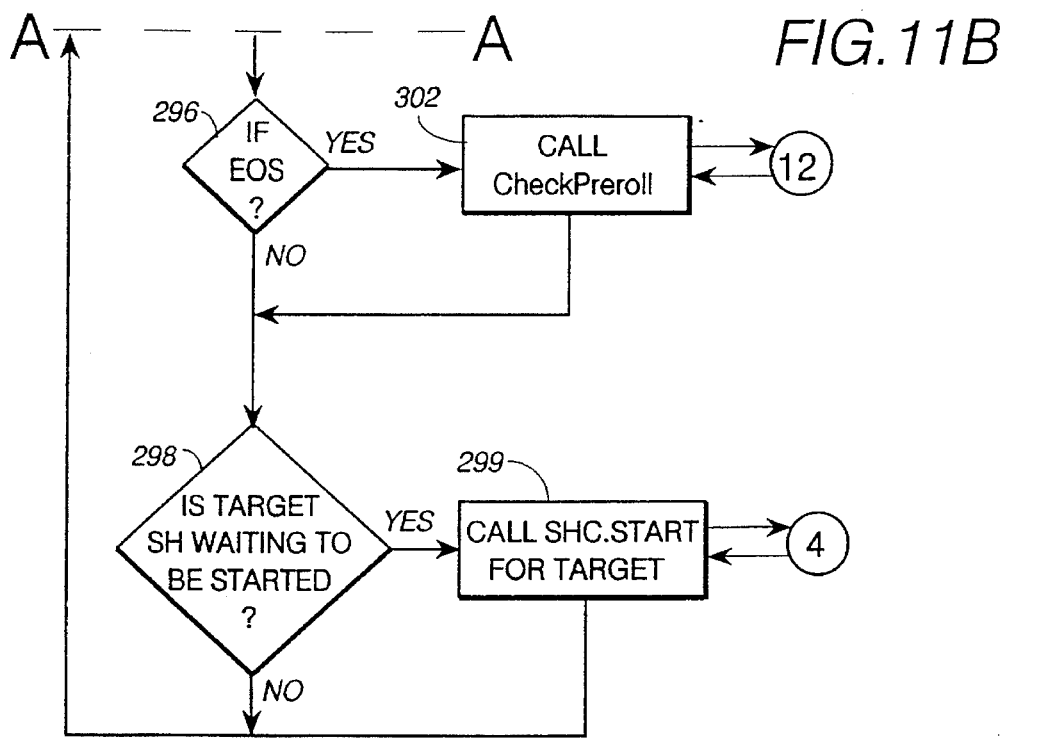

Referring to FIG. 11, when the ReturnFull routine is called to obtain a full buffer, step 280 first checks to see if there are any full buffers available. If none is, a return 282 is made. Is there is a full buffer, step 284 searches the chain of BCBs for the full buffer address and step 286 checks if a full buffer is found and if the source owns it. If not, step 288 sets error flag to indicate invalid buffer returned, and then return 282 is made. If step 286 is positive, step 290 determines if a buffer or a record is being returned. If it is a buffer, step 292 saves the buffer attributes and step 294 checks to see if there is a pending discard stop. If so, step 300 calls the CheckStopPending routine. Step 296 follows 300 or 294 and determines if the end of stream has been reached. If so, step 302 calls the CheckPreroll routine. If the end of stream is reached, step 298 checks to see if the target stream handler is waiting to be started. If so, step 299 calls the SHC.START routine to start target. If step 298 is negative, a loop to step 280 is made.

If step 290 determines a record is to be returned, step 304 validates that the record is in the buffer. Step 306 determines if the record pointer is ok. If not, step 308 sets an error flag indicating an invalid record has been returned, and step 282 then returns. If step 306 is positive, step 310 saves record attributes, allocates an RCB and adds it to BCB list. Then, step 312 checks for end of stream and last record for the buffer conditions, and step 294 follows.

Figure 12:
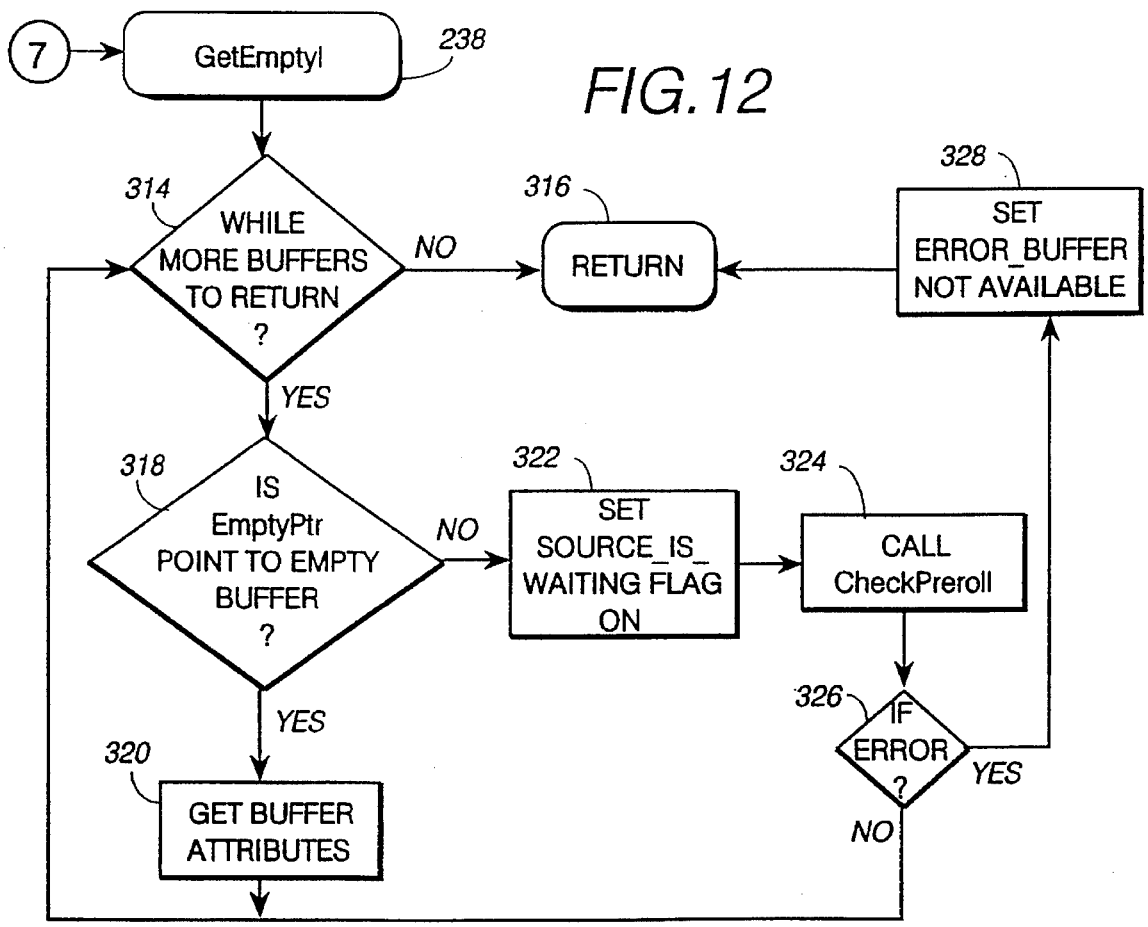

At the start of the GetEmpty routine shown in FIG. 12, step 314 determines if there are more buffers to get. If not, a return is made in 316. If so, step 318 checks if an empty pointer points to an empty BCB. If so, step 320 gets the buffer attributes and the loops back to 314. If step 318 is negative, step 322 turns on a Source.is.waiting flag indicating no buffer is available. Step 324 then calls the Check-Preroll routine. Step 326 checks for error. If none, a loop to step 314 is made. If there is an error, an error flag is set to indicate no buffer is available and a return is made by 316.

Figure 13:
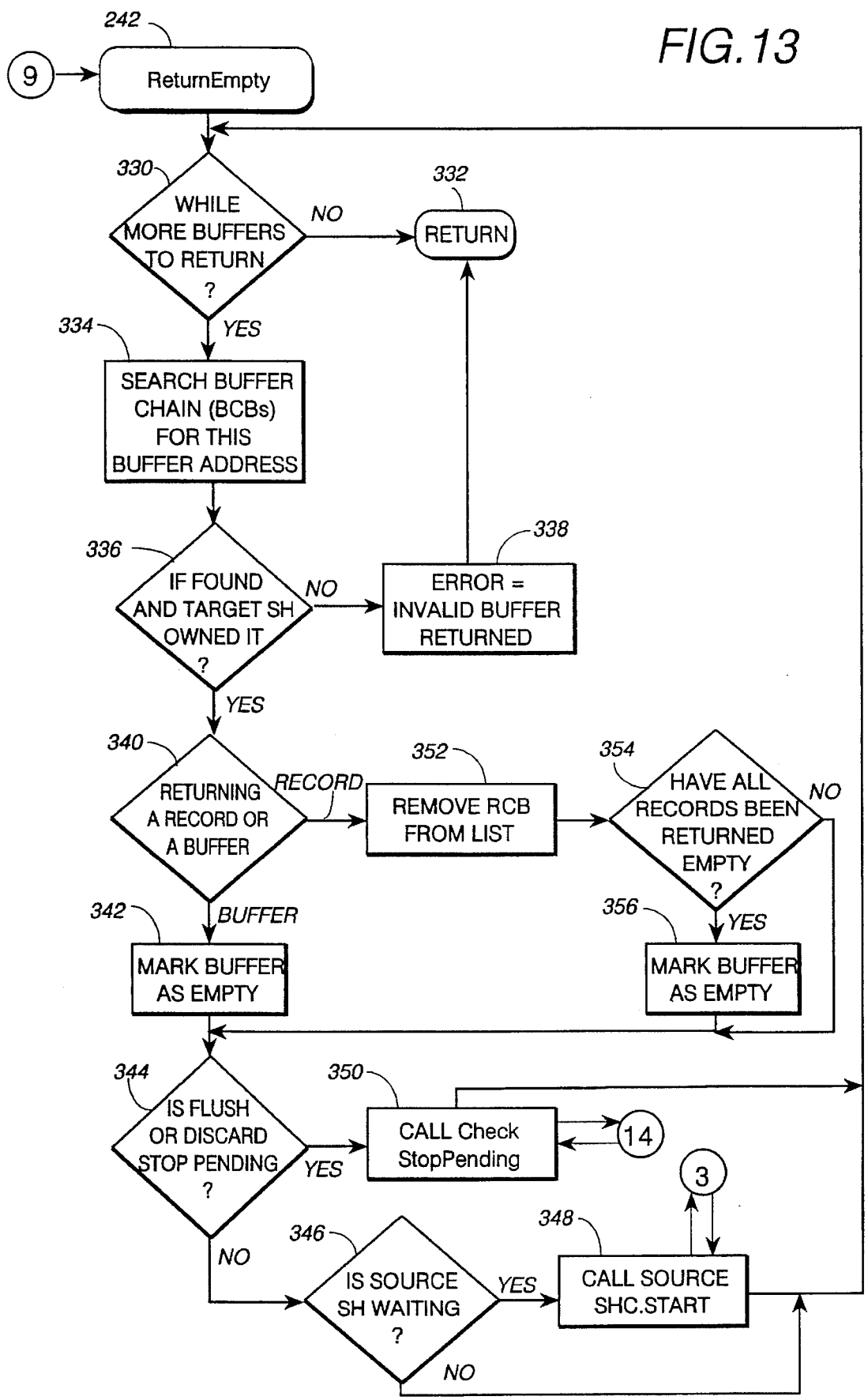

Referring to FIG. 13, ReturnEmpty routine begins with step 330 which checks to see if there are more buffers to return. If not, step 332 returns. If there are buffers, step 334 searches the chain of buffer BCBs for buffer address. Step 336 sees if buffer is found and if the target stream handler owns it. If not, step sets an error flag indicating an invalid buffer is returned. If step 336 is positive, step 340 determines if a record or a buffer is being returned. If it is a buffer, step 342 marks the buffer as empty, and step 346 sees if the source stream handler is waiting. If not, step 348 is skipped. If so, step 348 calls the source SHC.START routine. If step 344 is positive, step 350 then calls the CheckStopPending routine. Step 330 then follows either step 348 or 350. If a record is returned as determined in 340, step 352 removes the associated RCB from the RCB list and check 354 determines if all records have been returned empty. If so, step 356 marks the buffer as empty and step 344 then follows either step 354 or 356.

Figure 14:
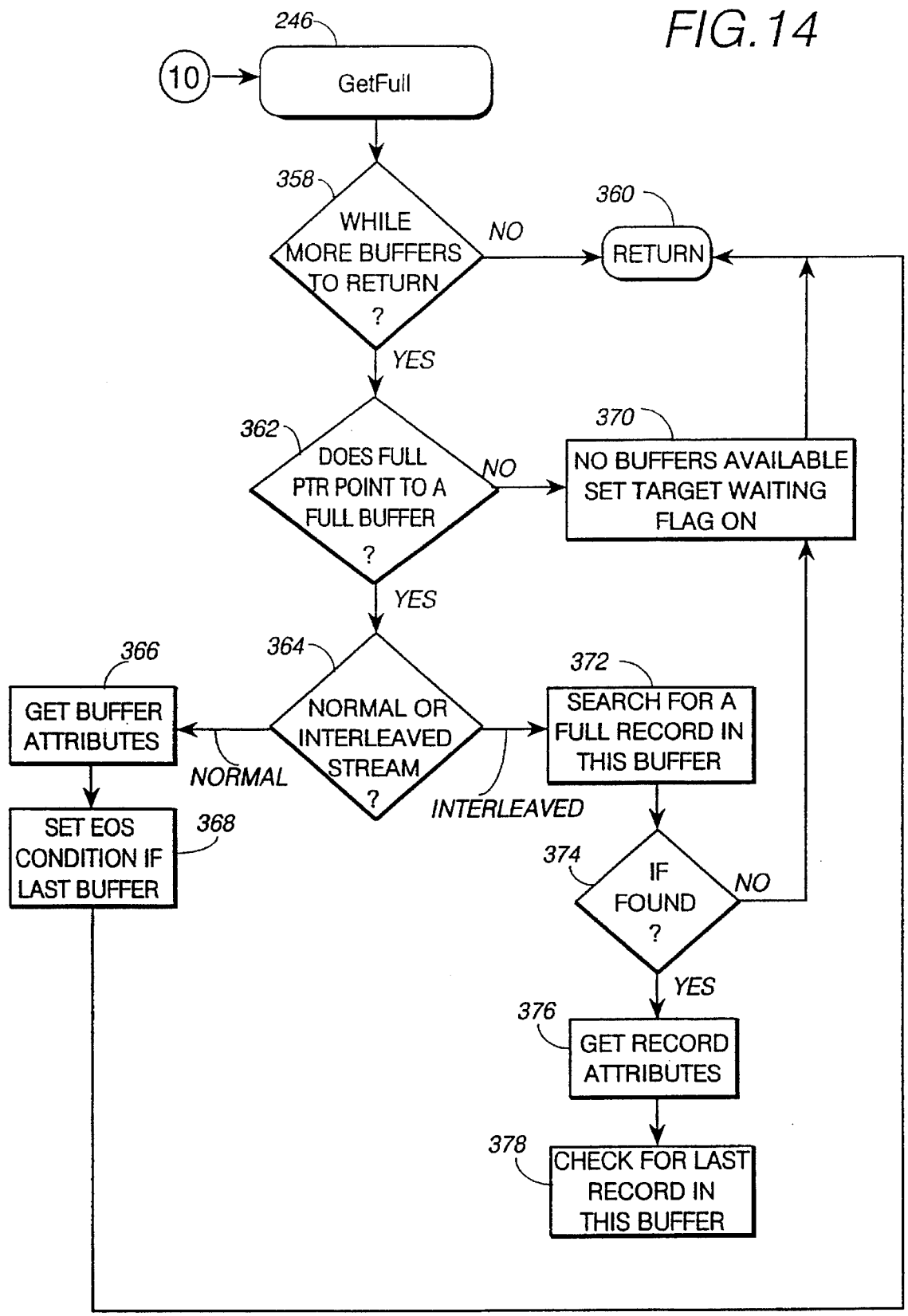

In the GetFull routine (FIG. 14), step 358 determines if there are more buffers to get. If not, return 360 occurs. If so, step 362 sees if the full pointer points to a full buffer. If not, no buffer is available, and step 370 sets the Target.waiting flag on and returns via 3360. If 362 is positive, step 364 determines the type of stream, normal (unified) or interleaved. If unified, step 366 gets the buffer attributes, step 368 sets the end of stream condition (EOS) when it is last buffer, and then returns via 360. For an interleaved or split stream, step 372 searches for a full record in the buffer. If one is found, as checked by 374, step 376 gets the record attributes and step 378 checks for last record in buffer before returning via 360.

Figure 15:
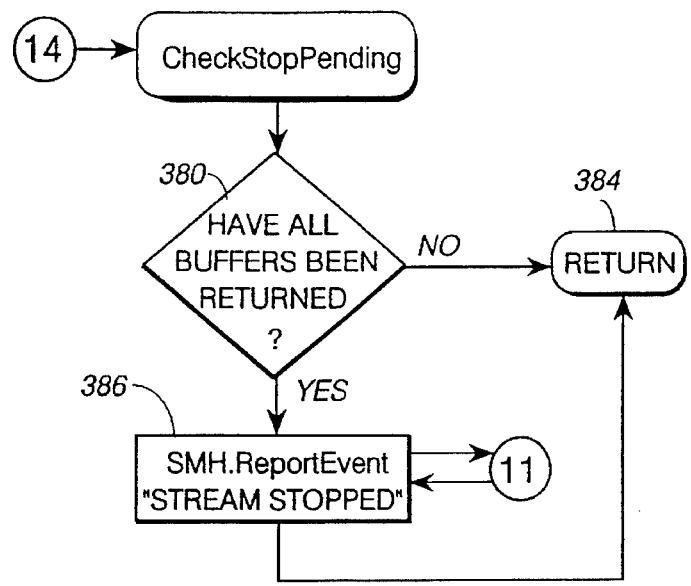

Referring to FIG. 15, the CheckStopPending routine checks in step 380 to see if all buffers have been returned. If not, a return is made by step 384. If so, step 386 calls the routine SMH.ReportEvent to report "Stream Stopped", and then returns by 384.

Figure 16:
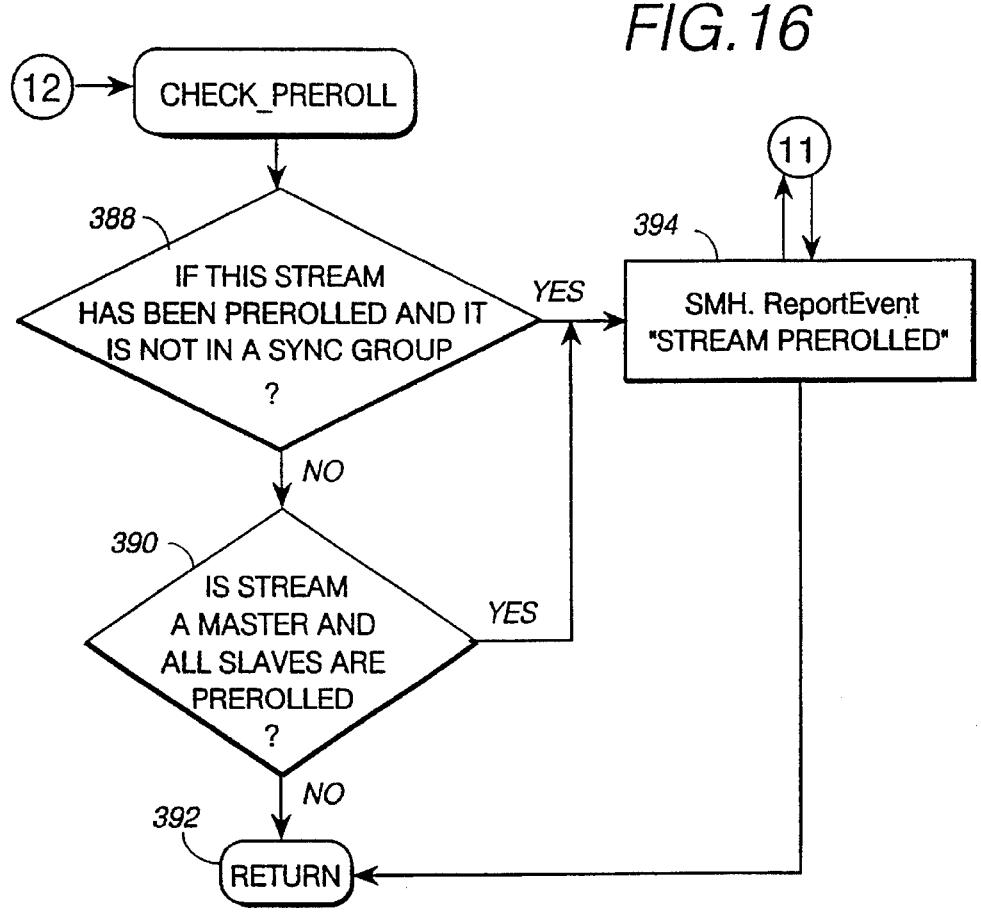

FIG. 16 shows the operation of the CHECK.PREROLL routine in which step 388 determines if the stream has been prerolled or primed and it is not in a sync group. If it is not, step 390 checks if the stream a master and all slaves have been prerolled. If not, a return is made via 392. If the results of steps 388 and 390 are positive, step 394 calls SMH.ReportEvent routine to report the "Stream Prerolled" before returning via 392.

Figure 17:
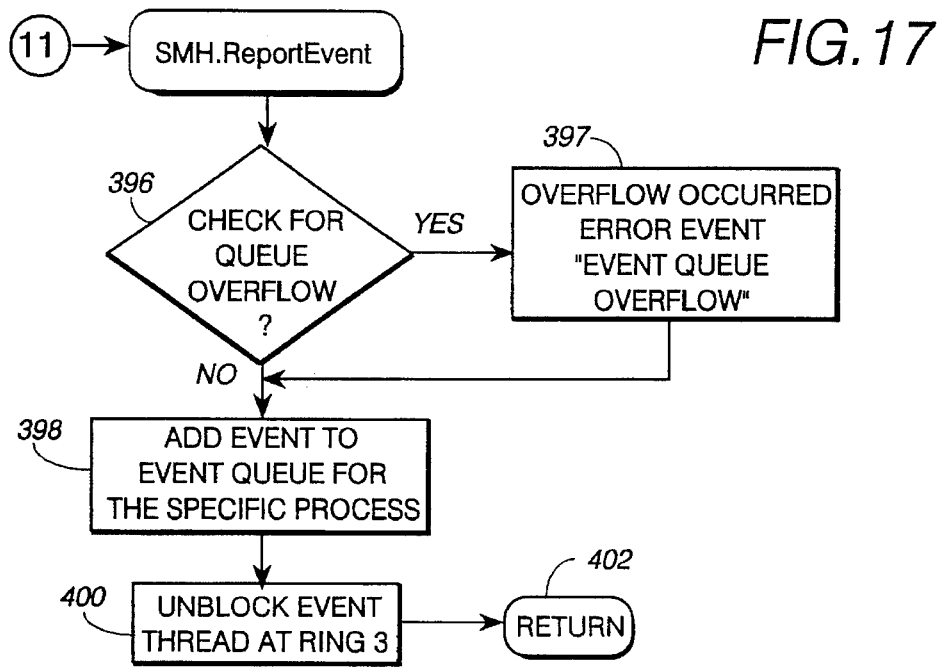

FIG. 17 shows the SMH.ReportEvent routine which is a call available at Ring 0 and Ring 3. Step 396 checks an event queue to see if it has overflowed. If it has, step 397 reports an error event and that "Event Queue Overflow" and then continues with step 398. Also, if there is no event queue overflow, step 398 adds the event to the event queue for the specific process, step 400 unblocks the event thread at ring 3, and step 402 returns.

Figure 18:
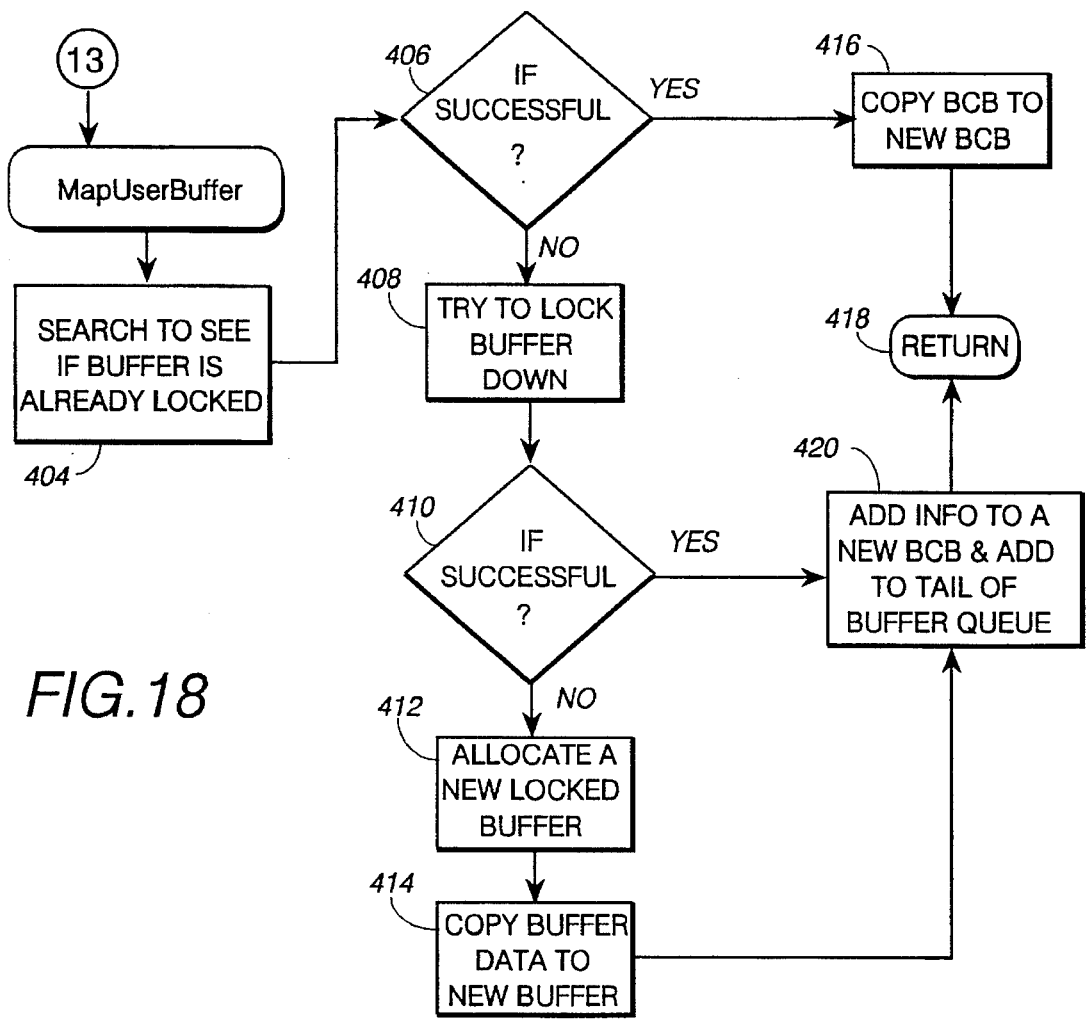

The operations in the MapUserBuffer routine are shown in FIG. 18 in which step 404 searches to see if buffer is already locked, i.e, buffer already in own list. If the buffer is locked, step 406 goes to step 416 which copies the BCB for the buffer to a new BCB list and then returns by 418. If the buffer is not locked, step 408 tries to lock the buffer. Step 410 determines if latter step was successful. If so, step 420 adds field information to the BCB and adds BCB to tail of buffer queue before returning at 418. If 410 is not successful, step 412 allocates a new locked buffer, and step 414 copies buffer data to new buffer, before passing on to steps 420 and 418.

Figure 19:
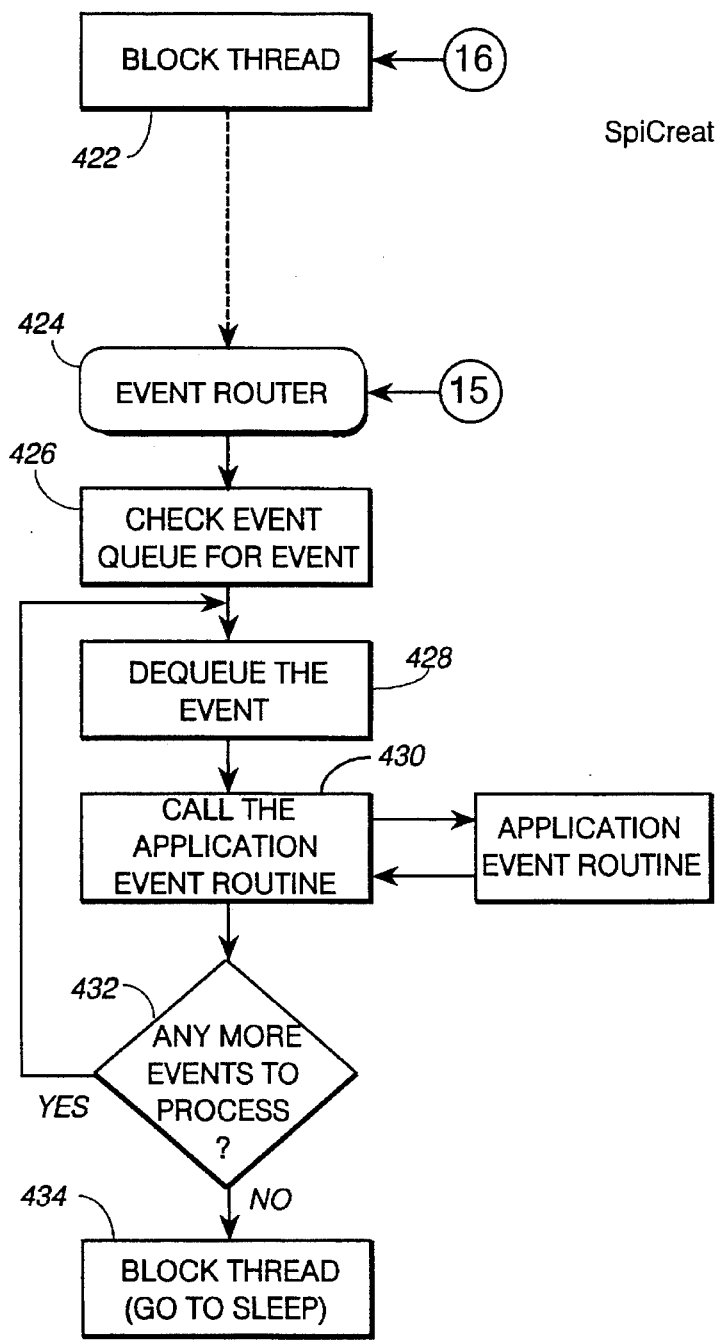

As shown in FIG. 19, event checking is obtained be adding to the routine at the desired point, a step 422 which blocks the thread. When the thread becomes unblocked, the EventRouter routine is called in step 424 which first checks in step 426, the event queue for an event and then dequeues the event in step 428. Step 430 calls the Application Event routine which handles the event. Step 432 then sees if there are any more events to process and if so, returns to step 428. When all events are processed, step 434 then blocks the thread.

As shown in FIG. 20, when an application program creates a stream, an SpiCreateStream API call is made to pass control to sync/stream manager 114 which in step 436 calls the source stream handler using the command SHC.CREATE. Then, the target stream handler is created using SHC.CREATE in step 438. Step 440 obtains the streaming parameters which are listed in a streaming protocol control block (not shown) and includes buffer numbers and size, data stream type, maximum number of records per buffer, minimum number of buffer needed to maintain constant data stream, number of empty buffers needed to start source stream handler, number of full buffers needed to start target stream handler, etc. Then, step 442 informs the source stream handler of the stream parameters, step 444 informs the target stream handler of the stream parameters, step 446 sets up the stream and allocates the stream buffers, and step 448 returns to the application.

Figure 21:
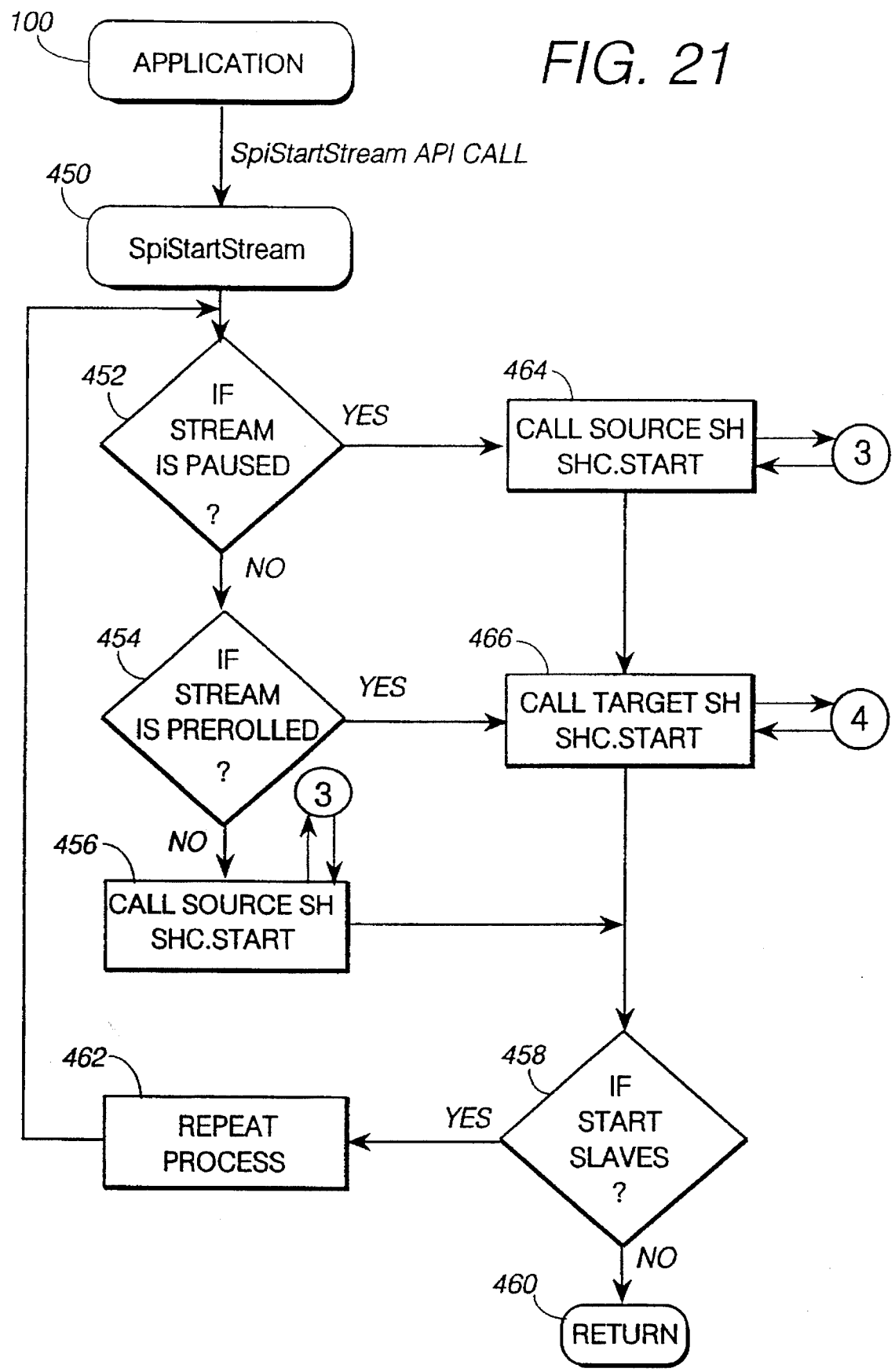
FIG. 21 is a flow chart of sync/stream manager start stream operations.

Referring to FIG. 21, when an application program issues a start streaming call, manager 114 receives an SpiStartStream API call, and step 450 executes the SpiStartStream routine which first checks in step 452 to see if the stream is paused. If not, step 454 determines if the stream is prerolled. If not, step 456 calls the source stream handler with the command SHC.START to unblock the source thread. Then step 458 checks to see if the stream is a slave stream in a sync group. If not, step 460 returns to the application program. If so, step 462 branches back to step 452 to repeat process for each slave stream. If step 452 answers "yes", step 464 calls the source stream handler with a SHC.START command to unblock the thread and then makes a call in step 466 to unblock the target stream handler. Step 466 also follows a "yes" result from 454. Step 458 then follows step 466.

FIG. 22 illustrates the event data structures. For each process, a process control block PCB is created which points to an event queue. As illustrated, there are two PCBs, PCB1 and PCB2 respectively set up for processes #1 and #2. Each PCB contains a field for the process ID, a field for an Event Thread ID, and a pointer 472 to the head of the associated event queue. The event queue contains a chain of headers 474 each of which contains a flag and a pointer to a users event control block EVCB 478. Such block, as shown in the enlargement, specifies the event type, event flag, stream handler ID, its status, and user parameters. The information in the event data structure is used by the event router routine (FIG. 19).

FIG. 23 illustrates operations of an SpiEnable routine 480 in which step 482 determines the stream handler to call, and step 484 calls the source or target handler identified in step 484. Step 484 is followed by a return 486.

Figure 24:
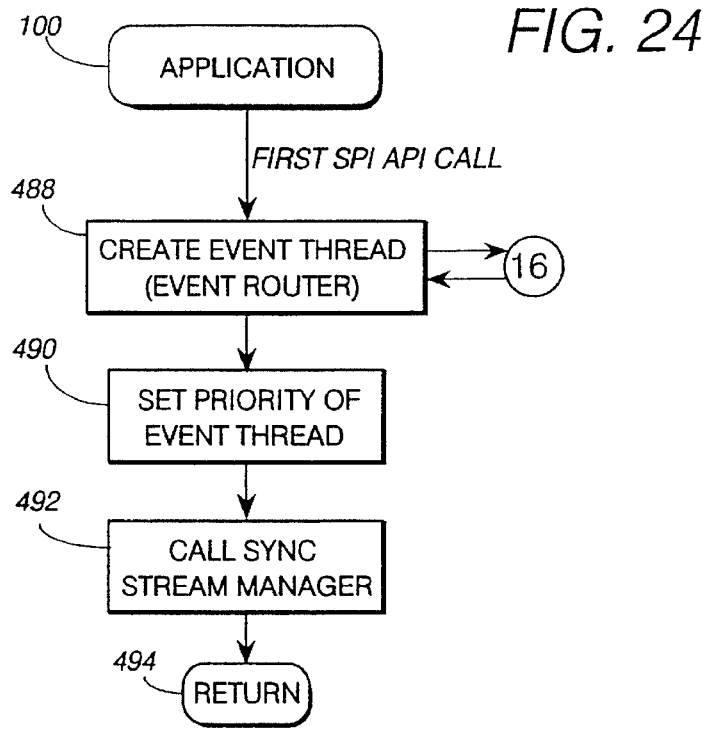
FIG. 24 is a flow chart how operations proceed from an application program to the sync/stream manager.

FIG. 24 illustrates what happens with the first Spi API call made at DLL initialize time, from an application. Step 488 creates and event thread by calling the EventRouter routine. Step 490 sets the priority of the event thread (ring 3 or 0), step 492 calls the sync/stream manager, and step 494 returns.

Figure 25:
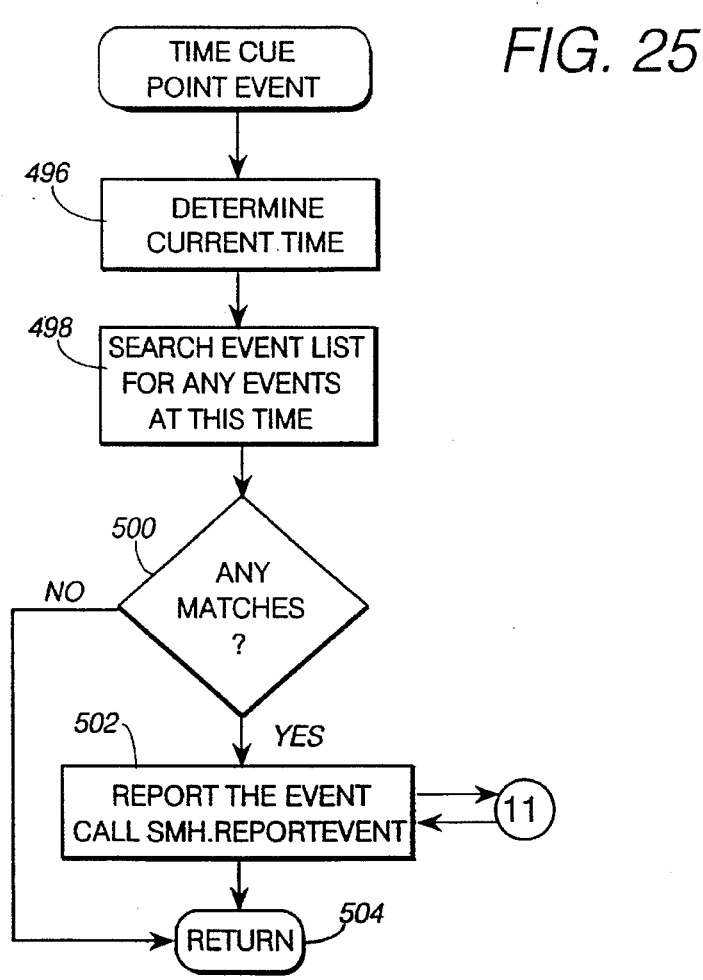
FIG. 25 is a flow chart of an example of event detection operations.

FIG. 25 provides an example of an event called a time cue point event, which can be placed in a stream handler, most likely a target stream handler. Step 496 determines the current time. Step 498 then searches the event queues or list for any events which are to occur at such time. Step 500 checks for any time matches. If there are none, step 504 returns. For each match, step 502 reports the event by call SMH.REPORTEVENT.

Summary Description

The invention incorporates several unique features that are believed novel and have not previously been integrated for multimedia data transport in any application or operating system software, the unique features including the following characteristics: Central Buffer Management with Application Buffering Option; Supports Bi-Level Data Stream Handlers; Support for Interleaved Data Streams; and Data Stream Event Detection and Notification. These unique features are implemented in a fully device-independent manner (beyond any existing physical device drivers). This solution further imposes no data type dependence on modules within the multimedia system extensions.

The generalized data streaming mechanism of the invention provides for device-independent multimedia data transport and is designed as multimedia extensions to IBM Operating System/2 (OS/2) Version 2.0. The mechanism provides system services that support the continuous movement of data for storage and/or retrieval, within real time constraints. For example, large digitized audio data files must be read from a hardfile and "played" by continuously transferring the data to a Digital-to-Analog Converter (DAC) device equipped with analog audio amplification circuitry.

The following four major features of the preferred embodiment of data streaming are central to this invention. Taken together, they represent a significant contribution to multimedia computing systems, and address all of the problems described in preceding sections.

Central Buffer Management with Application Buffering Option

Data stream resource management controls buffer allocation to and from a central buffer pool, sharing buffers among multiple stream handlers, and dynamic buffer locking/unlocking. In addition, data streams may use buffers allocated and managed by applications, particularly where the application is controlling the real-time creation of data to be transferred via the stream.

A set of buffer management routines provide the ability to get and return buffers from a pool of buffers allocated when the data stream is created. The memory for these buffers is allocated and also locked down at this time. The need to lock down the buffers ensures the system will not swap out the memory containing the buffers while the data is streaming.

To ensure the data being processed will stream in a continuous manner, a stream protocol control block associated with the stream is set up to contain information used to allocate the buffers. (i.e., the number of buffers, the buffer size, and values indicating when to start the stream handlers). This information is important because dependent on the type of data being streamed, the amount and size of buffers must be optimum to ensure that continuous streaming of data will occur, and at the same time, ensure that the system resources are not over used. (i.e., allocate more memory than is actually needed). Along with the allocation of memory, the values used to start the stream handlers ensures that enough buffers are filled by the source stream handler that the target stream handler can be started and assured that there is enough data buffered up to allow real-time data streaming to occur.

The Central Buffer Management routines allows for the source stream handler to get an empty buffer from the buffer pool, fill it with data from the input device (e.g., data from a file on the hard disk), and return the full buffer back to the buffer pool. The target stream handler will get a full buffer from the buffer pool, send this buffer to the output device (e.g., data sent to the audio device to be played to the speakers), and then return the empty buffer back to the buffer pool.

One unique feature of the buffer management routines is the ability to handle records within a buffer. This ability allows interleaved data to be processed with the minimum amount of data movement. The data is moved only once to the buffers, and subsequent access is via records within the buffer that contains the individual data (i.e., audio and video data etc.).

Another unique feature of the buffer management routines is the ability to allow a source stream handler to supply its own buffers to be added to the buffer pool and subsequently given to the target stream handler on request. As the buffers are given, they are locked down in memory at that time assuring they won't get swapped out and at the same time not consuming all the system memory resources for the entire duration of the data stream.

The following is a typical scenario that a typical stream handler would use to read data from a file and stream to a audio output device:

1. Application creates the data stream. The buffers will be allocated and locked down at this time.

2. Application will start the data streaming.

3. Source stream handler will:

Get an empty buffer.

Fill the buffer from the input device.

Return the full buffer.

Loop on the above three steps until the end of the data is encountered.

4. Target stream handler will:

Get a full buffer.

Drain the buffer to an output device.

Return the empty buffer.

Loop on the above three steps until the end of the data is encountered.

This set of buffer management routines, provides the capability to ensure a continuous flow of data can occurred from the source stream handler to a target stream handler.

Supports Bi-Level Data Stream Handlers

Provides identical system services for data stream handlers at different protection levels, allowing stream handlers to be developed as either OS/2 Physical Device Drivers (Protection Ring 0) or OS/2 Dynamic Link Libraries (Protection Ring 3).

The OS/2 architecture supports the Intel family of processors based on the 80286, including the 80386DX, 80386SX, and 80486, among others. These processors share a protection mechanism based on providing a series of privilege levels, or rings, numbered 0 to 3. At each level, different operations are permitted according to the relative risk that operation might pose to the integrity of the system. At privilege level 0, or "ring 0", all operations are permitted. This level is typically reserved for system code execution. Applications run at ring 3, where attempts to execute privileged instructions will generate a trap, handled by the operating system at ring 0, and typically resulting in the termination of the application.

Developing software at ring 0 is more difficult and more risky than at ring 3, due to the relative absence of system protection mechanisms active at ring 0. Special tools are required, including a Kernel debugger, in order to develop, test, and remove errors from ring 0 code modules. As a result, any function that does not require the special characteristics of ring 0 code, for instance the ability to execute in a hardware interrupt context, is typically written as a ring 3 executable. Debugging at ring 3 is much easier, and any runtime errors generated by ring 3 code will generally have no impact on other processes due to the greater protection afforded all ring 3 executables.

Usually, developers prefer to develop all code as ring 3 executables, except in cases where the special characteristics of ring 0 privilege provide the desired function. However, in developing OS/2 ring 0 modules the number and flexibility of available system services is quite limited. The only type of module that can be loaded for ring 0 execution is a Physical Device Driver (PDD). The only system services available for PDDs are the Device Help (DevHlp) functions provided by the OS/2 Kernel. These same DevHlp interfaces are not available to ring 3 modules, which must be programmed using a totally different set of system service interfaces.

The problem may arise, then, whenever an extension of the operating system is introduced. If the new services are provided only at ring 3, then a wide range of device control capabilities are impeded because modules which invoke the new services cannot also execute privilege level 0 instructions or execute in a hardware interrupt context. If the new services are provided only at ring 0, then all developers will suffer from the difficulty of creating ring 0 modules, whether they need to access privilege level 0 instructions or not.

The preferred embodiment is an OS/2 extension which provides data stream control services. These services are exported by the Sync/Stream Manager which is comprised of an OS/2 DLL and PDD pair. A data stream is controlled by one or more Stream Handlers that invoke the services exported by the Sync/Stream Manager.

In order to provide the greatest flexibility to stream handler developers, and to prevent rapid growth of ring 0 code, identical services are exported by the Sync/Stream Manager at both ring 0 and ring 3. This means that only those stream handlers that absolutely require ring 0 privilege will be written as OS/2 PDDs, while all others may be written as OS/2 DLLs, running at ring 3. Because the same interfaces are available at both privilege levels, the stream handler developer can create code using only one set of interfaces for controlling data streams.

The Sync/Stream Manager exports the same services to both ring 0 and ring 3 modules without creating duplicate service routines. Two entry points are exported for each function, one at ring 3 (in the Sync/Stream Manager DLL) and the other at ring 0 (in the Sync/Stream Manager PDD). Each of these entry points then vectors into a common subroutine. The common code may execute in either ring 0 or ring 3, whichever is most appropriate to the specific function being invoked.

Support for Interleaved Data Streams

This mechanism allows a single data stream source to stream data to multiple targets. This is called a split stream. For example, a device might interleave audio, image, and text data types within a single, formatted data track. A split stream handler is then used to extract each data type from the single interleaved data buffer, stream each data type independently, and deliver each stream to the appropriate target device. For example, CD-ROM XA can interleave waveaudio, video data and text data within the same data buffer. The Split stream handler is used to "split" the data into multiple streams for CD-ROM XA devices. It is more efficient for the Split stream handler to read this combined data into one buffer and then insert the video data into a video stream and the waveaudio data into an waveaudio stream without copying the data. The waveaudio data stream would then be consumed by an waveaudio stream handler and the video stream by a video stream handler. The waveaudio stream handler would "see" only the audio portions of the data stream and the video stream handler would "see" only the video portions of the stream.

A data stream can be "split" into multiple Split streams. The number is limited only by the resources of the system. Each separate "split" of the stream is a separate stream. The work of parsing and determining the different data is the job of the source stream handler, which actually fills an empty buffer with data from the source device. The source stream handler must determine which data goes in which stream. It must then return to the pointers to the individual "records" of the buffer. Each record is a portion of the buffer filled with data specific to one of the "split" streams. These records are returned to the sync stream manager indicating which stream they should go to. The sync stream manager will then queue these records in the respective buffer/record queue for one of the split streams sharing the buffer.

This type of split streams can be set up as follows. Multiple streams must be created, each with an SpiCreateStream api call to the sync stream manager. The first of these api calls is a normal stream creation call with a hstreamBuf parameter set to NULL. Every other subsequent SpiCreateStream call that needs to share the buffers of the first stream must pass that streams handle in the hstreamBuf parameter. This is the mechanism used by the sync stream manager to allow these split streams to share the buffers of the first stream. The source stream handler will also receive this parameter on an SHC_CREATE call and need to support this kind of streaming. A SPCBBUF_INTERLEAVED flag in the SPCB is set by the source stream handler to indicate whether it can do split streaming. If it can not, any SpiCreateStream attempting to use its buffers will be rejected. The split stream mechanism only works for one source and multiple targets.

Data Stream Event Detection and Notification

Stream events identify a specific change of state in a data stream. The data stream handler detects the specific event, and may either ignore the event or post a notification that the event occurred. The notification may be received by another stream handler or an application program.

The application has the ability to tell data streaming routines (via Enable/Disable events) which events should be detected. These events typically are error detection notification, stream cue time events and data cue events etc. Also stream handlers may need to be informed of conditions of the data stream that may warrant certain actions to be preformed to keep the data stream running in a real time manner. To accomplish this, these events need to be routed to application or stream handler event routine in a timely (real time) manner so that the appropriate action can be preformed before a minimum amount of time has elapsed. To complicate this event reporting is the fact that the stream handlers can be running at ring 0 or ring 3.

To report events from a ring 3 stream handler to a ring 3 stream handler or application is straight forward in that the registered event routine can be called in the context of the thread reporting the event. But when a ring 0 stream handler needs to report an event to a ring 3 stream handler or application, the problem arises in that the event can be detected by stream handler during interrupt time at ring 0 and there is no way to directly call the ring 3 event routine during this time. To solve this problem, a new time critical thread was created that has minimum task switching overhead and can be dispatched fast enough to allow an event to be reported in a real time environment. Time critical threads are non-interruptable during execution. For each application process, this new time critical thread is created to monitor the events being reported. The sequence of events to report an event are as follows:

1. The event is detected at interrupt time by the ring 0 stream handler.
2. The event is put on a queue of events and the new time critical thread is unblocked to allow it to run. It will run in the context of the ring 3 application.
3. The time critical thread gets control in the context of the application, dequeues the event from the event queue and calls the applications event routine.

This sequence of events is preformed in a minimum amount of time allowing the application to perform actions in real time thus making for a more robust and eye pleasing application.

It should be apparent to those skilled in the art that many changes can be made in the details and arrangements of steps and parts without departing from the scope of the invention as defined in the appended claims.

What is claimed is:

1. A multimedia data processing system comprising;

a processor;

a memory for storing at least one multimedia application program and a multitasking operating system, for execution by said processor, said memory having a plurality of buffers therein;

a source device operable as an origin for media data;

a target device operable as a destination for receiving said data from said source device; and data streaming apparatus operable under said operating system for streaming data from said source device to said target device, said apparatus comprising:

first means operative, in response to execution of a stream create instruction in said application program, to create a source thread for streaming data from said source device into said buffers and a target thread for streaming data from said buffers to said target device said threads being dispatchable units of execution that are selectively executable under said multitasking operating system;

second means operative, in response to a start instruction in said application program, to first execute said source thread and fill said buffers with data from said source device, to then execute said target thread and read data from said buffers into said target device, and to thereafter alternately execute both threads to alternately fill and read data from said buffers, until reaching an end of data from said source device;

wherein said first and second means comprise a plurality of stream handlers, one of said stream handlers being a source handler operative to control data flow from said source device to said buffers and another one of said stream handlers being a target stream handler operative to control data flow from said buffers to said target device; and a stream manager operative to interact with said stream handlers and control operation thereof by sending stream helper commands (SHCs) to said handlers and by providing stream manager helper (SMH) services to said handlers in response to receiving SMH calls from said handlers.

2. A multimedia data processing system in accordance with claim 1 wherein:

said SHCs include a SHC.CREATE command and a SHC.START command; and each stream handler is operative in response to receiving a SHC.CREATE command to create a thread and then to block such thread, said each stream handler being further operative in response to subsequently receiving a SHC.START command to unblock such thread and access said buffers in accordance with whether such thread is a source thread or a target thread.

3. A multimedia data processing system in accordance with claim 2 wherein:

each stream handler during accessing said buffers sends a SMH.NOTIFY call to said system manager; and said system manager being operative to manage a buffer pool and, in response to receiving said SMH.NOTIFY call, to receive a full buffer and return an empty buffer when called by a source stream handler and to return a full buffer and receive an empty buffer when called by a target stream handler.

4. A multimedia data processing system in accordance with claim 1 wherein:

said personal computer comprises a microprocessor having different priority levels of operation; and said stream handlers comprise dynamic link library (DLL) stream handlers that execute at one priority level and physical device driver (PDD) stream handlers that execute at a priority level higher than said one priority level.

5. A multimedia data processing system in accordance with claim 4 wherein:

said stream manager incudes routines executed at said priority levels in accordance with said priority level of the one of said stream handlers interacting therewith.

6. A multimedia data processing system in accordance with claim 1 wherein:

at least one of said stream handlers includes event detection means operative in response to detecting an event to notify an event handling routine.

7. A multimedia data processing system in accordance with claim 6 wherein:

said one stream handler operates at priority level 0 and comprises a time critical thread for notifying said event routine at a lower priority level.

* * * * *